United States Patent
Tsurumi et al.

(10) Patent No.: US 7,440,397 B2
(45) Date of Patent: Oct. 21, 2008

(54) PROTECTION THAT AUTOMATIC AND SPEEDILY RESTORE OF ETHERNET RING NETWORK

(75) Inventors: Osamu Tsurumi, Kawasaki (JP); Kenichi Kawarai, Kawasaki (JP); Akio Endou, Kawasaki (JP); Kazukuni Ugai, Kawasaki (JP); Akihiro Asa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 958 days.

(21) Appl. No.: 10/942,191

(22) Filed: Sep. 16, 2004

(65) Prior Publication Data
US 2005/0207348 A1 Sep. 22, 2005

(30) Foreign Application Priority Data
Mar. 17, 2004 (JP) ............................. 2004-076593

(51) Int. Cl.
*H04J 1/16* (2006.01)
(52) U.S. Cl. ........................................ 370/222; 370/226
(58) Field of Classification Search ........................ None
See application file for complete search history.

(56) References Cited

U.S. PATENT DOCUMENTS

| 6,209,039 | B1* | 3/2001 | Albright et al. | 709/249 |
| 6,590,891 | B1* | 7/2003 | Jacquet et al. | 370/350 |
| 7,190,686 | B1* | 3/2007 | Beals | 370/442 |
| 7,272,635 | B1* | 9/2007 | Longtin et al. | 709/208 |
| 2003/0012294 | A1* | 1/2003 | Nakamura et al. | 375/295 |
| 2003/0202477 | A1* | 10/2003 | Zhen et al. | 370/248 |
| 2003/0224808 | A1* | 12/2003 | Bonta | 455/463 |
| 2004/0063451 | A1* | 4/2004 | Bonta et al. | 455/519 |
| 2005/0050220 | A1* | 3/2005 | Rouyer et al. | 709/232 |
| 2005/0088980 | A1* | 4/2005 | Olkkonen et al. | 370/255 |
| 2006/0233186 | A1* | 10/2006 | Portolani et al. | 370/408 |
| 2007/0124498 | A1* | 5/2007 | Kaluve et al. | 709/242 |

OTHER PUBLICATIONS

S. Shah et al. Extreme Networks' Ethernet Automatic Protection Switching (EAPS) Version 1. Network Working Group Apr. 24, 2003.

* cited by examiner

*Primary Examiner*—Andrew Lee
(74) *Attorney, Agent, or Firm*—Katten Muchin Rosenman LLP

(57) ABSTRACT

A data relay apparatus stores identification information for identifying itself. A blocking unit blocks a port to avoid an occurrence of a loop path if the data relay apparatus is a master node, and blocks a port connected to a link of the data relay apparatus if a failure occurs to the link. When the link is restored from the failure, a comparing unit compares identification information of other apparatus connected to the link, with the identification information stored. Based on a result of the comparison, a determining unit determines whether the data relay apparatus should be set as a master node.

11 Claims, 19 Drawing Sheets

FIG.4

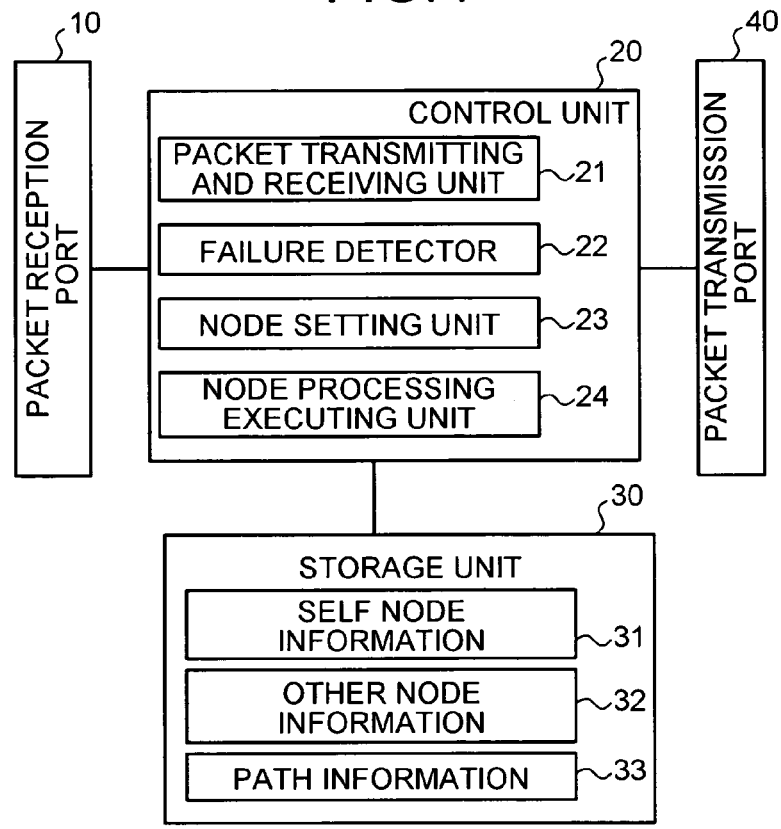

- 10 PACKET RECEPTION PORT
- 20 CONTROL UNIT
  - 21 PACKET TRANSMITTING AND RECEIVING UNIT
  - 22 FAILURE DETECTOR
  - 23 NODE SETTING UNIT
  - 24 NODE PROCESSING EXECUTING UNIT
- 40 PACKET TRANSMISSION PORT
- 30 STORAGE UNIT
  - 31 SELF NODE INFORMATION
  - 32 OTHER NODE INFORMATION
  - 33 PATH INFORMATION

FIG.5

| 0 | 1 | 2 | 3 | 4 | 5 |
|---|---|---|---|---|---|
| MAC DA | | | | | |
| MAC SA | | | | | |
| EtherType | | PRI/VLAN ID | | Type/Length | |
| Protection Length | | Status | Health | CTRL VLAN | |
| System MAC | | | | | |
| Bridge ID | | Node Status | | | |
| Hello Time | | Fail Time | | | |
| Controller/Partner | | link id | | domain num | |
| | | | | | |
| | | | | | |
| | | | | | |
| | | | | | |
| | | | | | |
| | | | | | |

FIG.6

| | |
|---|---|
| Protection Length | 0x0050 |
| Status | 0 : RING NORMAL<br>1 : RING FAILURE<br>2 : MAC FLASH<br>3 : TRAP PACKET<br>4 : Negotiation |
| Health | 1 : RING Health - Check<br>2 : SHARED LINK Health - Check |
| CTRL VLAN | MANAGEMENT VLAN ID |
| System MAC | NODE MAC ADDRESS |
| Bridge ID | NODE IDENTIFIER |
| Node Status | 0 : Master<br>1 : Transit |
| Hello Time | Health -Check TRANSMISSION INTERVAL |
| Fail Time | AUTONOMOUS SWITCHING TIME |
| Controller/Partner | 0 : Controller<br>1 : Partner |
| link id | SHARED LINK ID |
| domain num | NUMBER OF BELONGING RINGS |

FIG.11
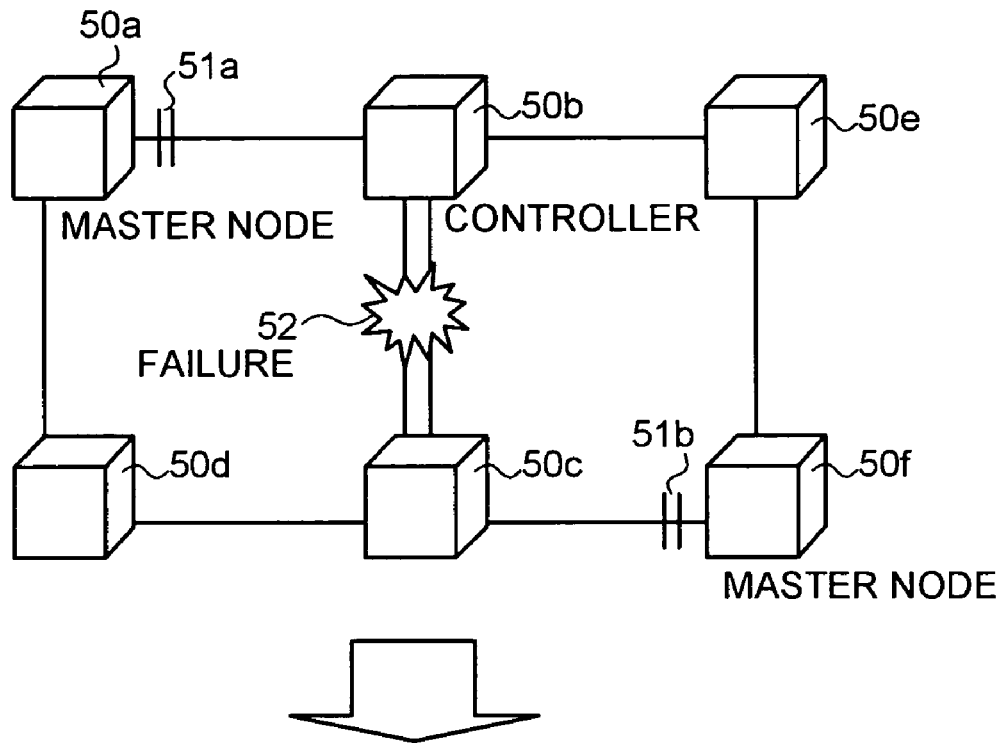
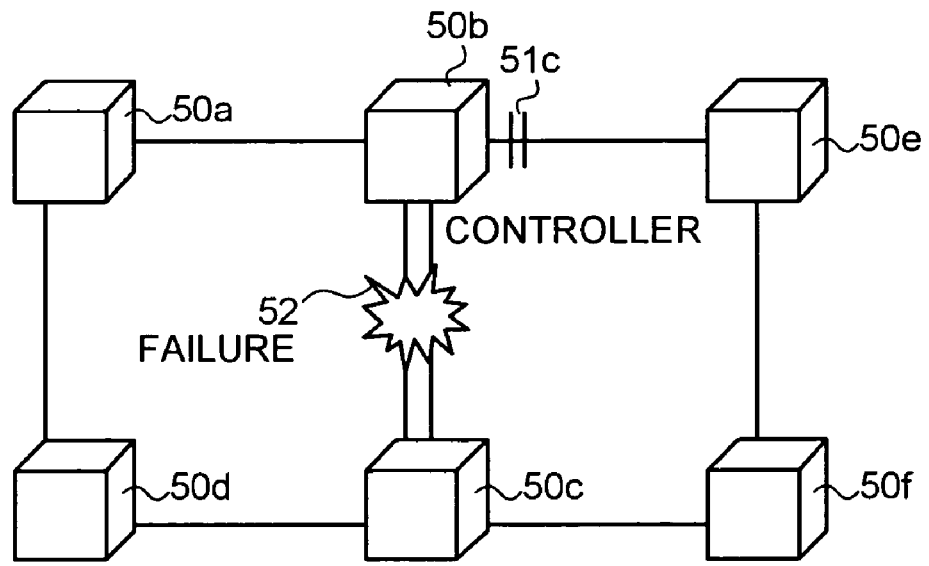

FIG.14
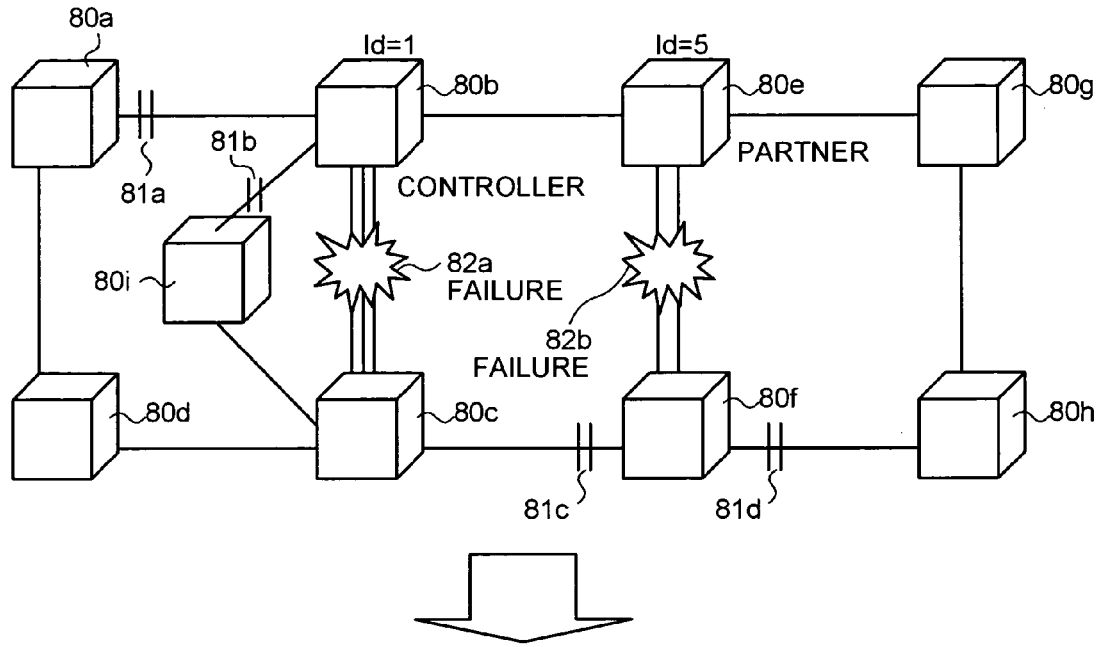
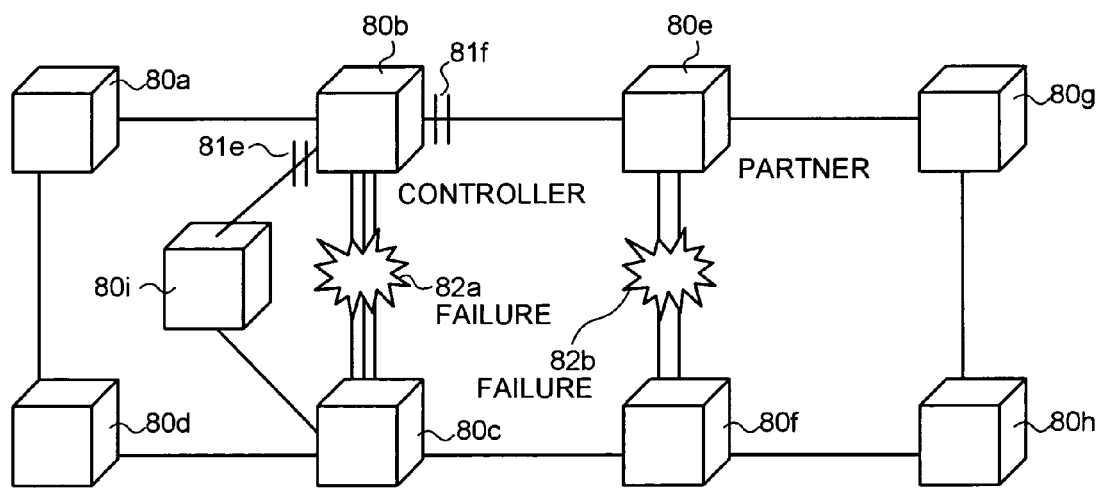

PROTECTION THAT AUTOMATIC AND SPEEDILY RESTORE OF ETHERNET RING NETWORK

BACKGROUND OF THE INVENTION

1) Field of the Invention

The present invention relates to ring network protection that speedily restore a ring network from a network failure by reducing the number of times of communication cut-off.

2) Description of the Related Art

Conventionally, a redundant network is constructed as a backbone network to avoid communication cut-off in the event of a failure. However, the redundant network has a disadvantage in that an undesirable loop occurs in a packet transmission path when a packet is to be transmitted. As a result, the packet may continue to circulate on the loop path.

To avoid occurrence of the loop in the packet transmission path, a spanning tree protocol (STP) technology is specified as a standard in Institute of Electrical and Electronic Engineers (IEEE) 802.1D. According to this STP technology, a part of a loop path is logically blocked, thereby preventing the loop packet transmission path even in the redundant network.

FIG. 22 is one example of a network based on the STP technology. In the STP technology, all nodes in a network exchange control information with one another, and set a root node. The network having loops is logically blocked to make the network loop-free, whereby a tree-structure network centering on the root node is constructed.

If a network failure occurs, a tree-structure network is re-constructed around the root node. Therefore, it takes a long time to restore the network to its original state. Thus, the disadvantage of the STP technology is that the network based on the STP technology is not suitable as the backbone network.

Under these circumstances, (S. Shah and M. Yip, "Extreme Networks' Ethernet Automatic Protection Switching (EAPS), Version 1", [online], [searched on Feb. 24, 2004 (H16)], Internet <URL: http://www.watersprings.org/pub/id/draft-shah-extreme-eaps-03.txt>) discloses a technique of Ethernet Automatic Protection Switching (EAPS) (registered trademark). According to EAPS, a master node logically blocks one of the ports connected to a ring network, and if a ring network failure occurs, the logically blocked port is released, thereby promptly resuming packet communication.

However, the conventional art disclosed in the above document has the following disadvantages. If a failure-occurs in the ring network, communication is cut off. Besides, even after the network is restored from the network failure, communication cut-off occurs until each node learns a new communication path.

Specifically, after restoring from the failure in the network, the master node transmits path information to the other nodes, to inform the other nodes about a new network path. Thus, the communication cut-off occurs twice.

SUMMARY OF THE INVENTION

It is an object of the present invention to at least solve the problems in the conventional technology.

A data relay apparatus according to an aspect of the present invention relays data in a ring network. The data relay apparatus includes a storage unit that stores identification information for identifying the data relay apparatus; a blocking unit that blocks a port to avoid an occurrence of a loop path if the data relay apparatus is a master node, and that blocks a port connected to a link of the data relay apparatus if a failure occurs to the link; a comparing unit that compares identification information of an other data relay apparatus with the identification information stored, when the link connected to the port blocked is restored from the failure, wherein the other data relay apparatus is connected to the data relay apparatus via the link; and a determining unit that determines whether the data relay apparatus should be set as the master node, based on the result of the comparison made.

A data relay method according to another aspect of the present invention is for relaying data in a ring network. The data relay method includes storing identification information for identifying a data relay apparatus; blocking a port to avoid an occurrence of a loop path if the data relay apparatus is a master node, and blocking a port connected to a link of the data relay apparatus, if a failure occurs in the link; comparing identification information of an other data relay apparatus with the identification information stored, when the link connected to the port blocked by the blocking unit is restored from the failure, wherein the other data relay apparatus is connected to the data relay apparatus via the link; and determining whether the data relay apparatus should be set as the master node, based on the result of the comparison made.

A software-readable recording medium according to another aspect of the present invention stores a Network-Element software that realizes the data relay method on a software.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 4 is a functional block diagram of configuration of a data relay apparatus;

FIG. 5 is one example of a format of control information exchanged between the data relay apparatuses;

FIG. 6 illustrates information included in the control information shown in FIG. 5;

FIG. 11 is a diagram to explain a protection process performed when a failure occurs to a shared link between two ring networks that belong to the data relay apparatus;

FIG. 14 is a diagram to explain a protection process performed if the numbers of ring networks belonging to the data relay apparatuses differ;

DETAILED DESCRIPTION

Exemplary embodiments of a data relay apparatus, a data relay method, and a software according to the present invention will be explained in detail with reference to the accompanying drawings.

A master node setting processing performed during a ring network failure according to the embodiment will be explained first with reference to FIGS. 1 and 2.

Figure 1:
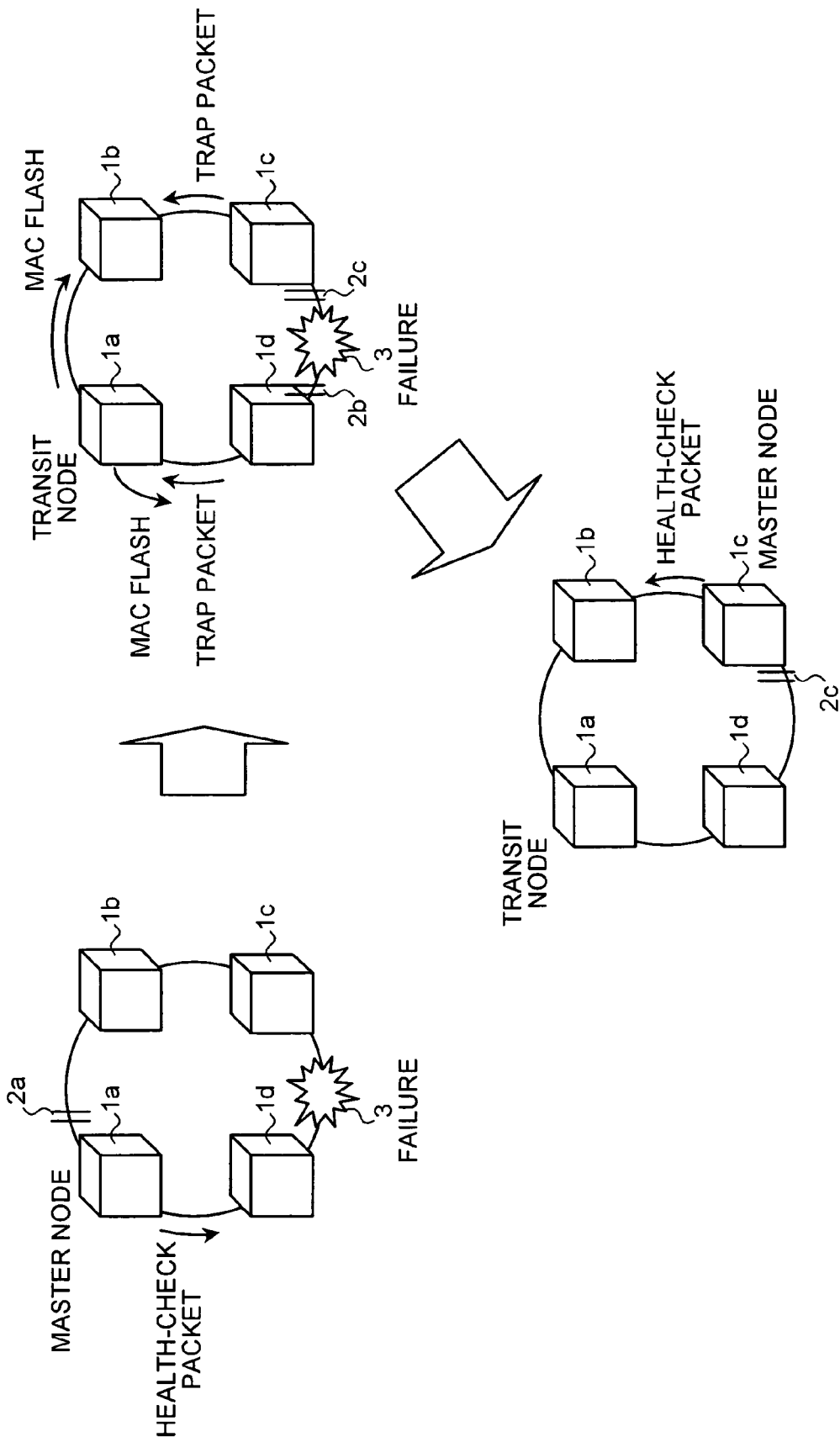
FIG. 1 is a diagram to explain a master node setting process that is performed during a ring network failure, according to an embodiment of the present invention.

As shown in FIG. 1, in an initial state, a node 1a is set as a master node. In addition, the node 1a logically blocks a port 2a connected to the node 1b to prevent occurrence of a loop path. The node 1a serving as the master node transmits a health-check packet for determining a failure, in a direction of a node 1d.

A node 1c and the node 1d, which detect occurrence of a failure 3, transmit trap packets for indicating that the occurrence of the failure 3 is detected, to the node 1a, the master node. The nodes 1c and 1d perform a process for logically blocking ports 2b and 2c connected to a link in which the failure 3 occurs.

If there is no failure, the health-check packet returns to the node 1a as a hello packet. If the node 1a receives at least one trap packet, or if the logically, blocked ports do not receive a hello packet within a predetermined time (fail time), the node 1a determines that the failure 3 has occurred.

If the failure 3 is determined, the node 1a releases the logically blocked port 2a. In addition, the node 1a transmits a medium access control (MAC) flash packet for requesting all other nodes 1b to 1d to flash data transmission path information that the nodes 1b to 1d have learned, to the nodes 1b to 1d. The node 1a changes from the master node to a normal mode (transit node) and stops transmitting the health-check packet.

During restoration from the failure 3, the nodes 1c and 1d, which have transmitted the trap packets, set the logically blocked ports 2b and 2c into a pre-forwarding state. In the "pre-forwarding state", transmission and reception of the data packet are rejected, but transmission and reception of a control packet including control information is permitted. The reason of setting the ports 2b and 2c into the pre-forwarding state is to prevent a loop path from temporarily occurring simultaneously with the restoration from the failure 3.

While the ports 2b and 2c are in the pre-forwarding state, each of the nodes 1c and 1d transmits a negotiation packet, thereby setting either the node 1c or 1d as the master node.

Specifically, the node 1c or 1d transmits a bridge ID (BID) information stored in itself as the negotiation packet, the node having a smaller BID (node 1c in this embodiment) is set as a master node, and the node having a larger BID (node 1d in this embodiment) is set as a transit node.

The node 1d set as the transit node sets the logically blocked port 2b from the pre-forwarding state into a forwarding state in which data transmission and reception can be performed. The node 1c set as the master node sets the logically blocked port 2c from the pre-forwarding state into a logically blocked stat, and starts transmitting a health-check packet.

Figure 2:
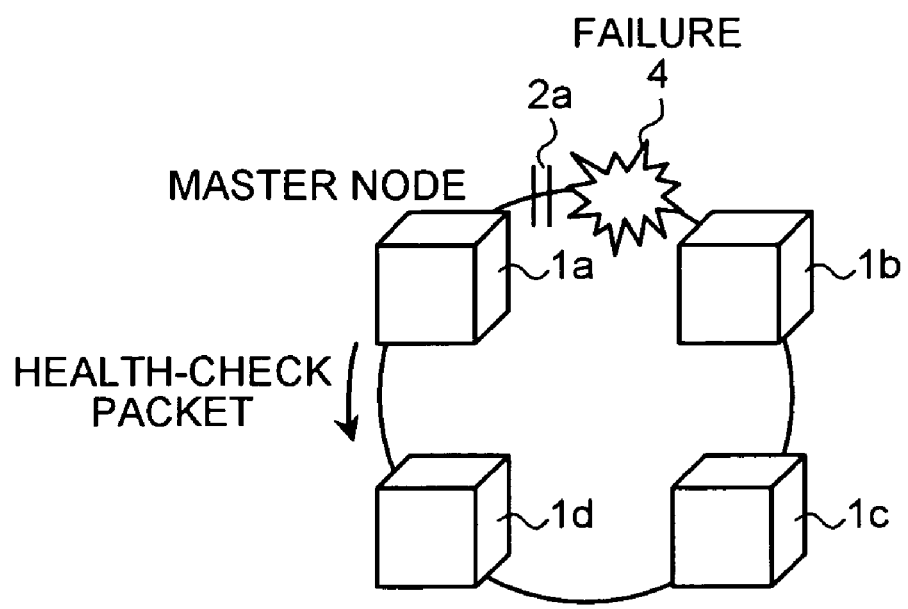
FIG. 2 is another diagram to explain the master node setting processing that is performed during the ring network failure.

However, as shown in FIG. 2, when a failure 4 occurs to a link which is connected to the node 1a serving as the master node and which is connected to the port 2a that is originally logically blocked, the node 1a does not perform the master node setting processing but keeps the port 2a in the logically blocked state.

An example of occurrence of a failure to a link between the nodes is explained next. However, the master node setting processing can be performed similar to that when a failure occurs to a node that belongs to the ring network.

Explaining specifically with reference to FIG. 1, if a failure occurs to the node 1c, then each of the nodes 1b and 1d detects the failure that occurs to the node 1c, and transmits a trap packet to the node 1a serving as the master node indicating that occurrence of the failure is detected. Each of the nodes 1b and 1d then performs a processing for logically blocking a port connected to a link side to which the node failure occurs.

If the node 1a receives at least one trap packet, or if the logically blocked port does not receive the hello packet, that is, the health-check packet transmitted from the node 1a in the direction of the node 1d within the predetermined time (fail time), the node 1a determines that a failure occurs.

Further, if the failure occurs, the node 1a releases the logically blocked port. The node 1a transmits the MAC flash packet for requesting all the other nodes 1b to 1d to flash the data transmission path information learned by the nodes 1b to 1d, to the nodes 1b to 1d. The node 1a is then changed from the master node to the transit node, and stops transmitting the health-check packet.

During restoration from the node failure, each of the nodes 1b and 1d, which transmits the trap packets, sets the logically blocked port into the pre-forwarding state. The node 1c restored from the failure sets the port connected to the nodes 1b and 1d into a pre-forwarding state.

While the ports are in the pre-forwarding state, each of the nodes 1b and 1d transmits a negotiation packet through the node 1c, and a BID of the node 1b and that of the node 1d are compared, whereby one of the nodes 1b and 1d is set as the master node, and the other node 1d or 1b is set as the transit node.

The node set as the transit node sets the logically blocked port from the pre-forwarding state into the forwarding state in which data transmission and reception can be performed. The node set as the master node sets the logically blocked port from the pre-forwarding state into the logically blocked state, and starts transmitting a health-check packet.

As explained with reference to FIGS. 1 and 2, when a failure occurs to the ring network, nodes adjacent to the failure block failure-side ports. When the ring network is restored from the failure, the node set as the master node, from among the nodes adjacent to the failure, continues to block the ports to make it unnecessary for the nodes to learn path information at the time of failure. It is thereby possible to reduce the number of times of communication cut-off, and speedily restore the network from the network failure.

FIGS. 1 and 2 are examples in which the number of ring networks is one. However, as shown in FIG. 3, the present invention is also applicable to an example in which a plurality of ring networks is present.

Figure 3:
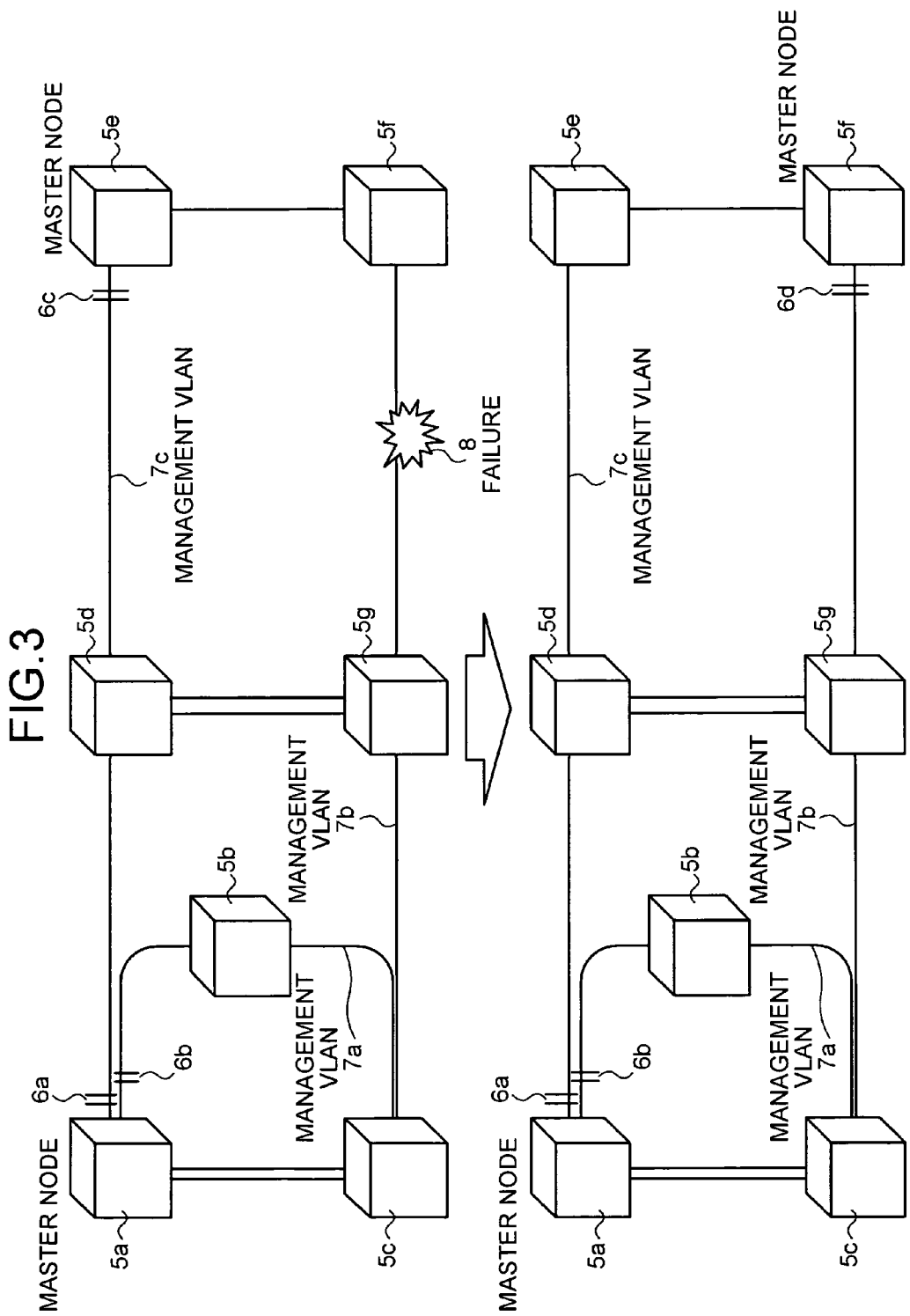
FIG. 3 is a diagram to explain a master node setting process performed if a plurality of ring networks is present.

In the example shown in FIG. 3, a management virtual local area network (VLAN) 7a is constituted by connecting nodes 5a, 5b, and 5c to one another. A management VLAN 7b is constituted by connecting nodes 5a, 5d, 5g, and 5c to one another. A management VLAN 7c constituted by connecting nodes 5d, 5e, 5f, and 5g to one another.

The node 5a is a master node in the management VLAN 7a and management VLAN 7b, and logically blocks ports 6a and 6b connected to the management VLAN 7a and the management VLAN 7b, respectively. Likewise, the node 5e is a master node in the management VLAN 7c, and logically blocks a port 6c connected to the management VLAN 7c.

The protection method as explained with reference to FIGS. 1 and 2 is applied to each of the management VLANs 7a to 7c thus set. By doing so, even if a failure 8 occurs to the management VLAN 7c, an influence of the failure 8 on the other management VLANs 7a and 7b can be prevented, and a range in which the failure 8 spreads can be restricted.

Configuration of a data relay apparatus (node) according to this embodiment will be explained next. FIG. 4 is a functional block diagram of the configuration of the data relay apparatus. As shown in FIG. 4, the data relay apparatus includes a packet reception port 10, a control unit 20, a storage unit 30, and a packet transmission port 40.

The packet reception port 10 receives packets transmitted from the other nodes. The packet reception port 10 includes one or a plurality of ports, and receives the packets from the nodes connected to the respective ports.

The control unit 20 controls entirety of this data relay apparatus. The control unit 20 includes a packet transmitting and receiving unit 21, a failure detector 22, a node setting unit 23, and a node processing executing unit 24.

The packet transmitting and receiving unit 21 receives the packets through the packet reception port 10, and transmits the packets from predetermined ports of the packet transmission port 40 based on path information 33 stored in the storage unit 30.

The failure detector 22 performs a processing for detecting a communication failure when the communication failure occurs to a link connected to a self node or the other node connected to the link. Specifically, the failure detector 22 detects the failure that occurs to the link connected to the self node or the other node connected to the link based on a state of a signal level of the packet. Further, when detecting the failure, the failure detector 22 transmits a trap packet to a master node.

The node setting unit 23 transmits and receives control information to and from the other node connected to the link when the link is restored from the link failure detected by the failure detector 22, thereby setting the self node as either a master node or a transit node.

Specifically, when the link is restored from the link failure, the node setting unit 23 sets logically blocked ports into a pre-forwarding state. The node setting unit 23 then transmits BID information stored as self node information 31 in the storage unit 30, as a negotiation packet, or receives BID information from the other node connected to the link.

Thereafter, the node setting unit 23 sets the self node as the master node if the BID of the self node is smaller than that of the other node, and sets the self node as the transit node if the BID of the self node is larger than that of the other node.

If the BID of the self node is equal to that of the other node, the node setting unit 23 further compares information on System MAC address of the self node included in the control information with that of the other node. If the System MAC address of the self node is smaller than that of the other node, the node setting unit 23 sets the self node as the master node. If larger, the node setting unit 23 sets the self node as the transit node.

If the other node is restored from a failure detected by the failure detector 22, the node setting unit 23 transmits and receives the control information to and from a third node connected to a link connected to the other node restored from the failure. The node setting unit 23 thereby sets the self node as the master node or the transit node.

Specifically, if the other node is restored from the failure, the node setting unit 23 sets the logically blocked ports into a pre-forwarding state. The node setting unit 23 then transmits the BID information which is stored in the storage unit 30 as the self node information 31, as the negotiation packet, or receives BID information from the third node.

Thereafter, the node setting unit 23 sets the self node as the master node if the BID of the self node is smaller than that of the third node, and sets the self node as the transit node if the BID of the self node is larger than that of the third node.

If the BID of the self node is equal to that of the third node, the node setting unit 23 further compares information on System MAC address of the self node included in the control information with that of the third node. If the System MAC address of the self node is smaller than that of the third node, the node setting unit 23 sets the self node as the master node. If larger, the node setting unit 23 sets the self node as the transit node.

The node processing executing unit 24 executes various processing to be performed by the self node as the master node or the transit node, in a normal state, during occurrence of a failure, or during restoration from the failure.

During restoration from the failure, in particular, if the self node is set as the master node, the node processing executing unit 24 transmits a health-check packet. In addition, the node processing executing unit 24 logically blocks ports to prevent occurrence of a loop path in the network.

The storage unit 30 is a storage device such as a memory, and stores the self node information 31, other node information 32, and path information 33. The self node information 31 is information on the self node such as the self node MAC address and the BID. The other node information 32 is information on nodes other than the self node, such as the MAC address and the BID of each of the other nodes.

The path information 33 is information on a packet transfer destination. Specifically, the path information 33 includes a MAC address of the packet transfer destination, and information on ports to which a node having this MAC address is connected.

The packet transmission port 40 transmits a packet to the other node. This packet transmission port 40 includes one or a plurality of ports, and transmits the packet to nodes connected to the respective ports.

A format of the control information exchanged between the data relay apparatuses (nodes) will next be explained.

FIG. 5 is one example of such the format. FIG. 6 illustrates information included in the control information shown in FIG. 5.

As shown in FIG. 5, the control information includes information on MAC DA, MAC SA, EtherType, PRI/VLAN ID, Type/Length, Protection Length, Status, Health, CTRL VLAN, System MAC, Bridge ID, Node Status, Hello Time, Fail Time, Controller/Partner, link id, and domain num.

"MAC DA" and "MAC SA" indicate a destination MAC address and a source MAC address, respectively. "EtherType" indicates a protocol type. "PRI/VLAN ID" identifies a VLAN. "Type/Length" indicates a packet frame type. 2Protection Length" identifies a protection method according to the present invention. As shown in FIG. 6, Protection Length is set to 0x0050.

"Status" indicates a node processing status. As shown in FIG. 6, if the ring network is normal, the Status is set at 0. If a failure occurs to the ring network, the Status is set at 1. If the MAC flash is transmitted to each node, the Status is set at 2. If a trap packet is transmitted to the master node, the Status is set at 3. If a failure occurs to the ring network and a negotiation packet is exchanged between the nodes to set the master node, the Status is set at 4.

"Health" indicates a type of the health-check packet. As shown in FIG. 6, a health-check packet that determines whether a failure occurs to the ring is assigned 1. A health-check packet that determines whether a failure occurs to a shared link shared between the self node and the other node, if the self node manages a plurality of ring networks, is assigned 2. Whether the shared link is present will be explained later in detail.

"CTRL VLAN" identifies a management VLAN in use. "System MAC" is a MAC address of a node that transmits control information. "Bridge ID" is information that identifies a node referred to when a master node is selected. "Node Status" indicates whether the node that transmits the control information is a master node or a transit node. As shown in FIG. 6, if the node that transmits the control information is the master node, the Node Status is set at 0. If the node is the transit node, the Node Status is set at 1.

"Hello Time" indicates a time interval for transmitting a health-check packet. "Fail Time" indicates time set for the master node. If the master node does not receive the hello packet within this Fail Time, then it is determined that a failure occurs and a master node switching process is executed.

"Controller/Partner" indicates whether the self node is set as a controller or a partner if a failure occurs to a plurality of shared links.

The controller is a node connected to a shared link, and that functions independently to prevent occurrence of a loop path if a failure occurs to a plurality of shared links. The partner is a node connected to a shared link other than the shared link to which the controller is connected. An instance in which a failure occurs to a plurality of shared links will be explained later in detail.

The "link id" identifies each shared link. The "domain num" indicates the number of ring networks belonging to the node that transmits the control information.

Figure 7:
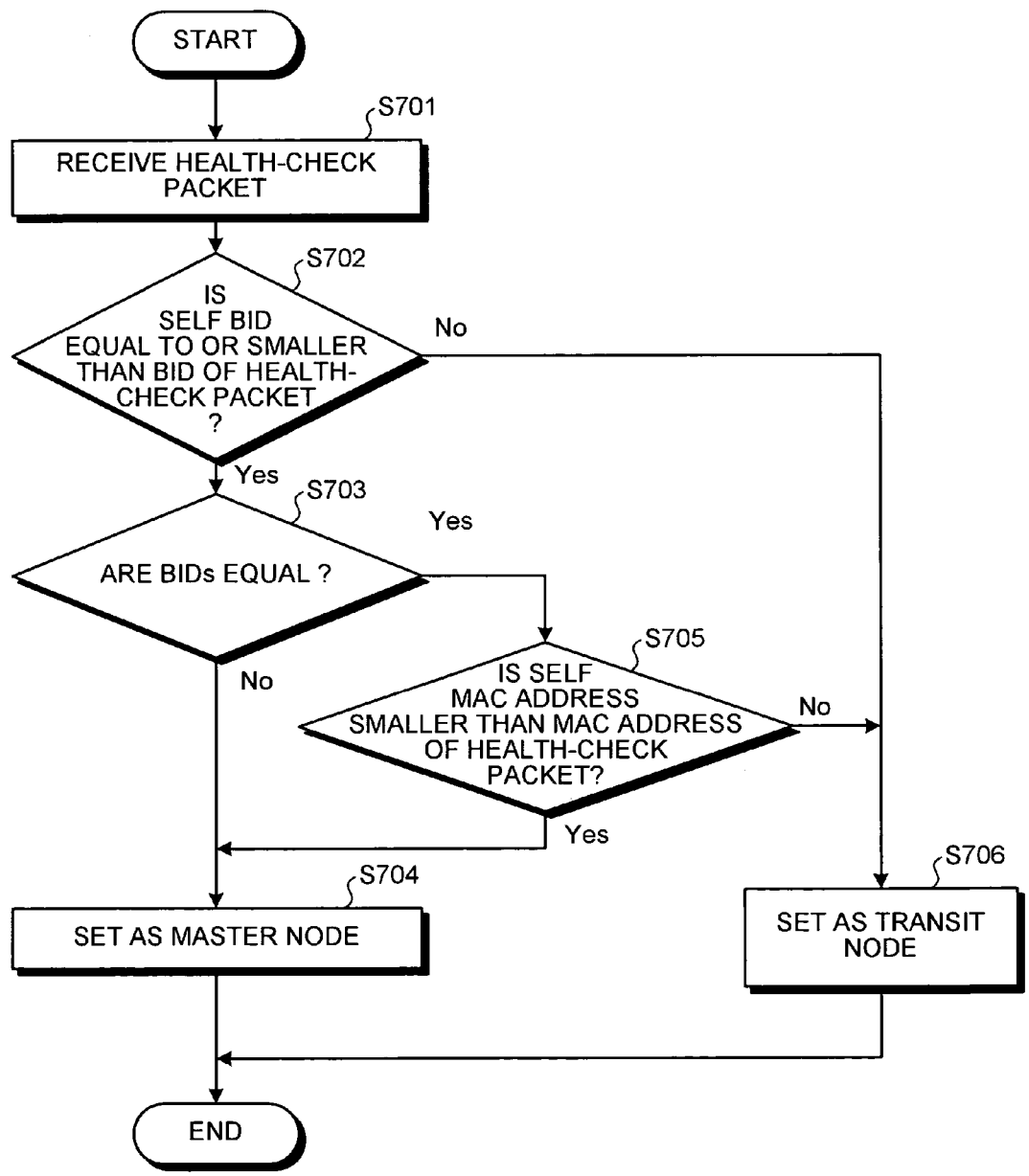
FIG. 7 is a flowchart of process procedures of a master node/transit node setting process performed by the data relay apparatus.

Process procedures for a master node/transit node setting process performed by the data relay apparatus (node) will be explained next with reference to a flowchart in FIG. 7.

The packet transmitting and receiving unit 21 of the data relay apparatus receives the health-check packet transmitted by the master node (step S701). The node setting unit 23 checks whether the BID of the self node is equal to or smaller than that of the master node included in the health-check packet (step S702).

If the BID of the self node is equal to or smaller than that of the master node included in the health-check packet (Yes at step S702), the node setting unit 23 checks whether the BIDs are equal (step S703).

If the BIDs are not equal (No at step S703), then the node setting unit 23 sets the self node as the master node (step S704), and the process ends. Thereafter, the node processing executing unit 24 of the node set as the master node starts transmitting a health-check packet.

If the BIDs are equal (Yes at step S703), the node setting unit 23 checks whether the MAC address of the self node is smaller than that of the master node included in the health-check packet (step S705).

If the MAC address of the self node is smaller than that of the master node included in the health-check packet (Yes at step S705), then the process proceeds to step S704 at which the node setting unit 23 sets the self node as the master node, and the process ends.

If the BID of the self node is larger than that of the master node included in the health-check packet (No at step S702), and if the MAC address of the self node is not smaller than that of the master node included in the health-check packet (No at step S705), then the node setting unit 23 sets the self node as the transit node, and the process ends.

If the self node is switched from the master node to the transit node, the node processing executing unit 24 stops transmitting the health-check packet.

Process procedures for a failure detection process performed by the data relay apparatus (node) that is set as the master node will be explained next with reference to a flowchart in FIG. 8.

The packet transmitting and receiving unit 21 of the data relay apparatus set as the master node transmits a health-check packet (step S801). The node processing executing unit 24 checks whether the self node has received a trap packet (step S802).

If the self node receives a trap packet (Yes at step S802), the node processing executing unit 24 transmits a MAC flash packet to the other nodes (step S805). If the self node does not receive a trap packet (No at step S802), the node processing executing unit 24 checks whether the logically blocked ports receive the hello packet within the fail time (step S803).

If the self node receives the hello packet within the fail time (Yes at step S803), then the node processing executing unit 24 waits until hello time passes (step S804), and the process returns to the step S801 at which the packet transmitting and receiving unit 21 transmits the health-check packet again.

If the self node does not receive the hello packet within the fail time (No at step S803), the process proceeds to the step S805 at which the node processing executing unit 24 transmits the MAC flash packet to the other nodes.

Thereafter, the node processing executing unit 24 releases the logically blocked ports (step S806), and transmits a ring failure occurrence packet that indicates that a ring failure has occurred (step S807), and the failure detection process ends.

Figure 9:
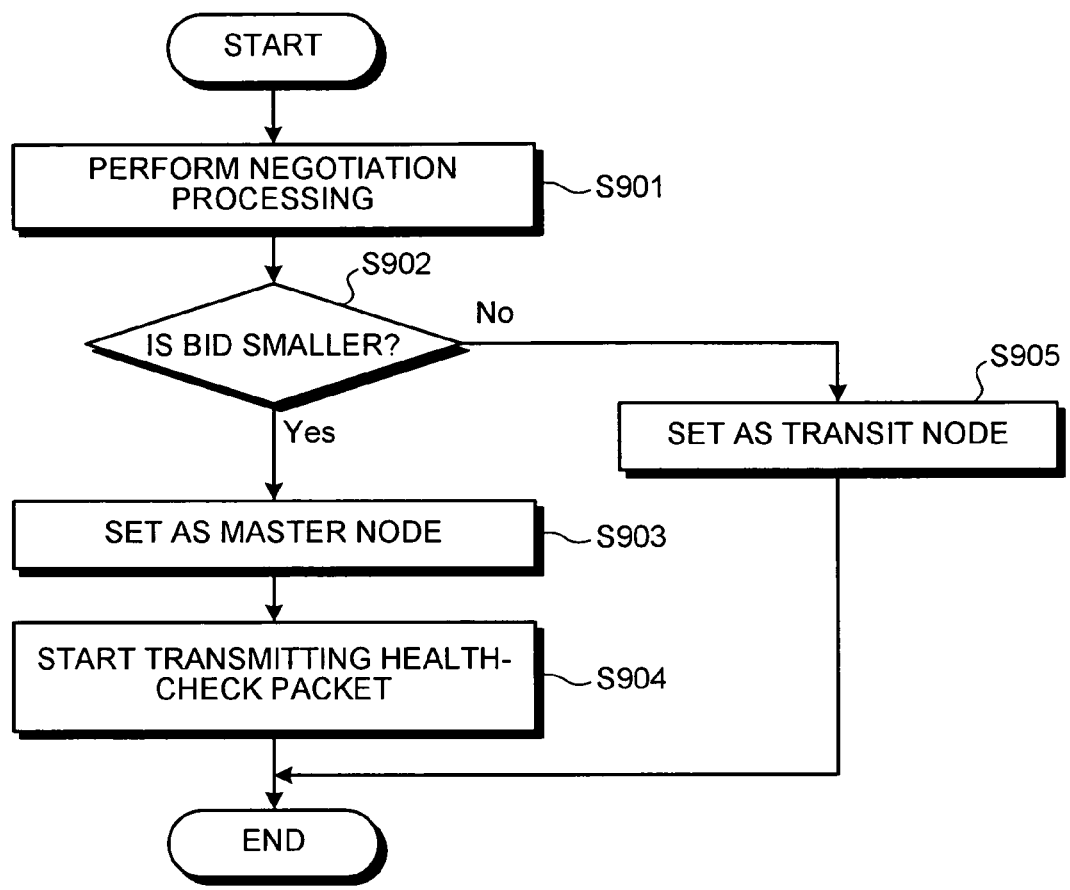
FIG. 9 is a flowchart of process procedures of a master node switching process performed by the data relay apparatus that is connected to a link connected to a failure link or failure node, during restoration from the failure.

Process procedures for a master node switching process performed by the data relay apparatus (node) connected to the link that is connected to a failure link or failure node during restoration from the failure will be explained next with reference to a flowchart in FIG. 9.

After restoration from the failure, the node setting unit 23 of the data relay apparatus performs a negotiation processing with a failure link or the other node connected to the link which is connected to a failure node (step S901).

Specifically, the node setting unit 23 sets the port on a side of the link restored from the failure into a pre-forwarding state, and exchanges control information including the BID information on the self node with the other node connected to the failure link or the failure node.

The node setting unit 23 checks whether the BID of the self node is smaller than that of the other node (step S902). If the BID of the self node is smaller than that of the other node (Yes at step S902), the node setting unit 23 sets the self node as the master node (step S903).

Thereafter, the node processing executing unit 24 starts transmitting a health-check packet (step S904), and the master node switching processing ends.

If the BID of the self node is not smaller than that of the other node (No at step S902), the node setting unit 23 sets the self node as the transit node (step S905), and the master node switching processing ends.

Figure 10:
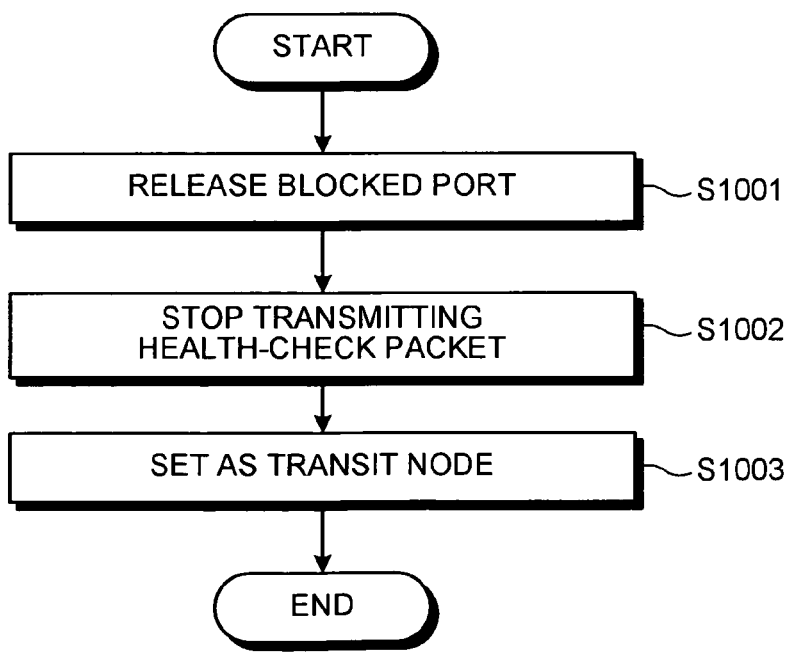
FIG. 10 is a flowchart of process procedures of a transit node switching process performed by the data relay apparatus that is set as the master node, before occurrence of a failure.

Process procedures for a transit node switching process performed by the data relay apparatus (node) that is set as the master node before occurrence of a failure will be explained next with reference to a flowchart in FIG. 10.

The node processing executing unit 24 of the data relay apparatus releases the logically blocked port (step S1001), and stops transmitting the health-check packet (step S1002).

Thereafter, the node setting unit 23 sets the self node as the transit node (step S1003), and this transit node switching process ends.

A protection process performed when a failure occurs to a shared link between the two ring-networks that belong to the data relay apparatus (node) will be explained next with reference to FIG. 11.

Nodes 50b and 50c are included in two ring networks, one constituted by connecting a node 50a serving as a master node, and nodes 50b, 50c, and 50d to one another, and the other, constituted by connecting the node 50b, the node 50c, a node 50f serving as a master node, and a node 50e to one another.

The nodes 50b and 50c share a link of the two ring networks between them. The nodes 50a and 50f serving as the master nodes, respectively, logically block ports 51a and 51b to prevent the ring networks from turning into a loop path.

Of the nodes 50b and 50c, the node that operates independently when a failure occurs is set as a controller in advance. In the example shown in FIG. 11, the node 50b is set as the controller. If a failure 52 occurs to the shared link, the failure detector 22 in each of the nodes 50b and 50c detects occurrence of the failure 52 and transmits a trap packet.

Figure 8:
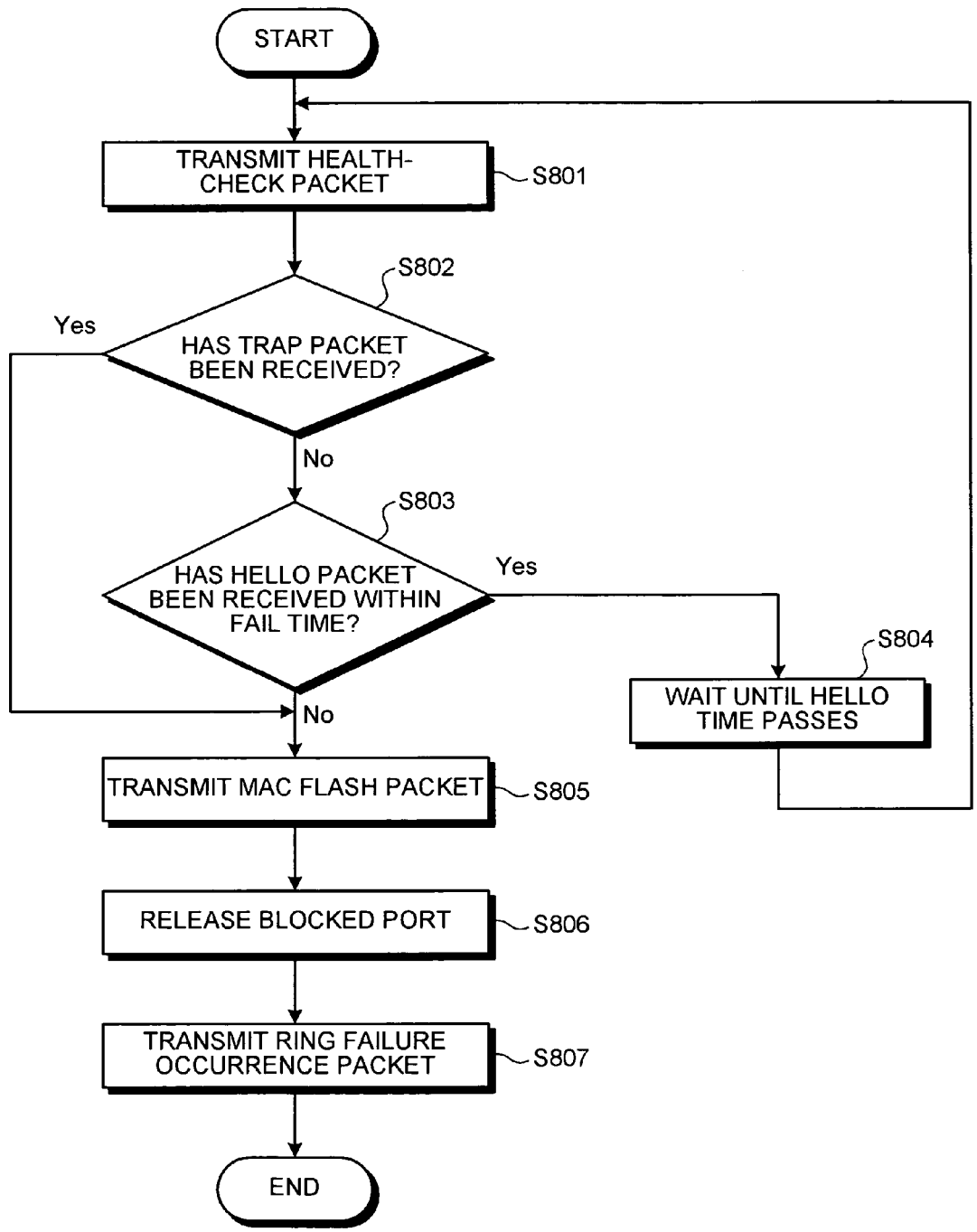
FIG. 8 is a flowchart of process procedures of a failure detection process performed by the data relay apparatus that is set as a master node.

If the nodes 50a and 50f serving as the master nodes do not receive the health-check packets transmitted by themselves within the fail time or receive the trap packets, then the nodes 50a and 50f release the logically blocked ports 51a and 51b, respectively (see FIG. 8).

On the other hand, the node 50b serving as the controller logically blocks one port 51c connected to a link other than the shared link. As a result, a loop path (super loop) constituted by the nodes 50a, 50d, 50c, 50f, 50e, and 50b can be prevented. If a failure occurs to a link other than the shared link or a node, the processing shown in FIGS. 1 and 2 is executed.

Figure 12:
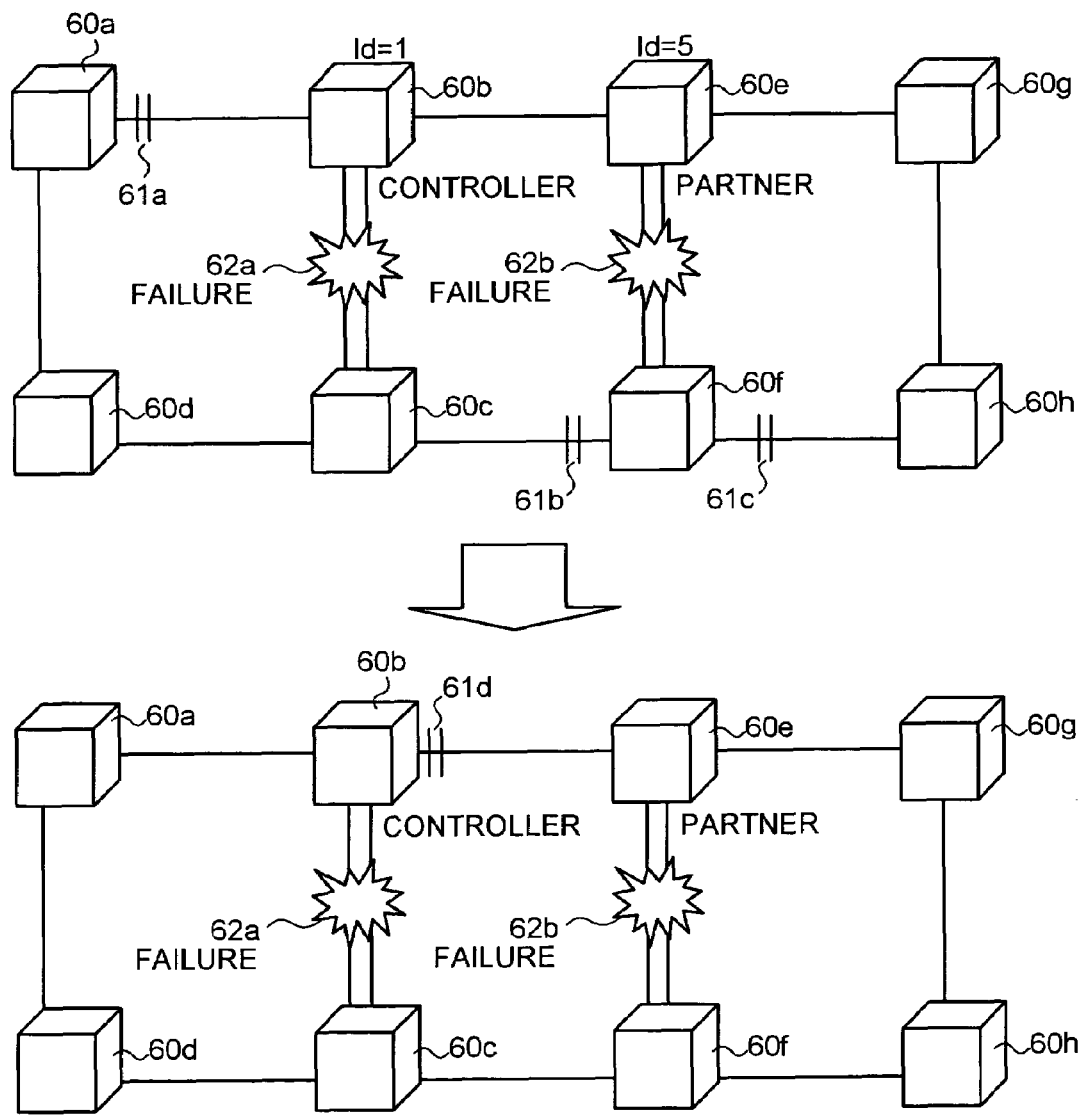
FIG. 12 is a diagram to explain a protection process performed by the data relay apparatus when failures occur in two respective shared links.

A protection process performed by the data relay apparatus (node) when failures occur to two respective shared links will be explained next with reference to FIG. 12.

Nodes 60b and 60c are included in two ring networks, one constituted by connecting a node 60a serving as a master node, and nodes 60b, 60c, and 60d to one another, and the other constituted by connecting the nodes 60b and 60c, a node 60f serving as a master node, and a node 60e to one another.

The nodes 60b and 60c share a link of the two ring networks between them. The node 60a serving as the master node logically blocks the port 61a to prevent the ring networks from turning into a loop path. The logical blocking of this port 61a is released when a link failure is detected.

The nodes 60e and 60f are included in two ring networks, one constituted by the nodes 60b and 60c, the node 60f serving as the master node, and the node 60e to one another, and the other constituted by connecting the node 60e, the node 60f serving as the master node, and nodes 60h and 60g to one another.

The nodes 60e and 60f share a link of the two ring networks between them. The node 60f serving as the master node logically blocks ports 61b and 61c to prevent the ring networks from turning into a loop path. The logical blocking of the ports 61b and 61c is released when a link failure is detected.

Out of a pair of the nodes 60b and 60e, and a pair of the nodes 60c and 60f, the pair of the nodes that operates independently when a failure occurs is set in advance. In the example shown in FIG. 12, the pair of the nodes 60b and 60e is selected.

The selected nodes 60b and 60e exchange control information when failures occurs to the two respective shared links. The node 60b having a smaller shared link ID is set as a controller that independently operates when the failure occurs, and the node 60e having a larger shared link ID is set as a partner.

The node 60b serving as the controller sets one of ports other than those connected to the shared links into a forwarding state, and sets the other port 61d into a logically blocked state. Thus, occurrence of a super loop including the nodes 60a, 60d, 60c, 60f, 60h, 60g, 60e, and 60b can be prevented.

Figure 13:
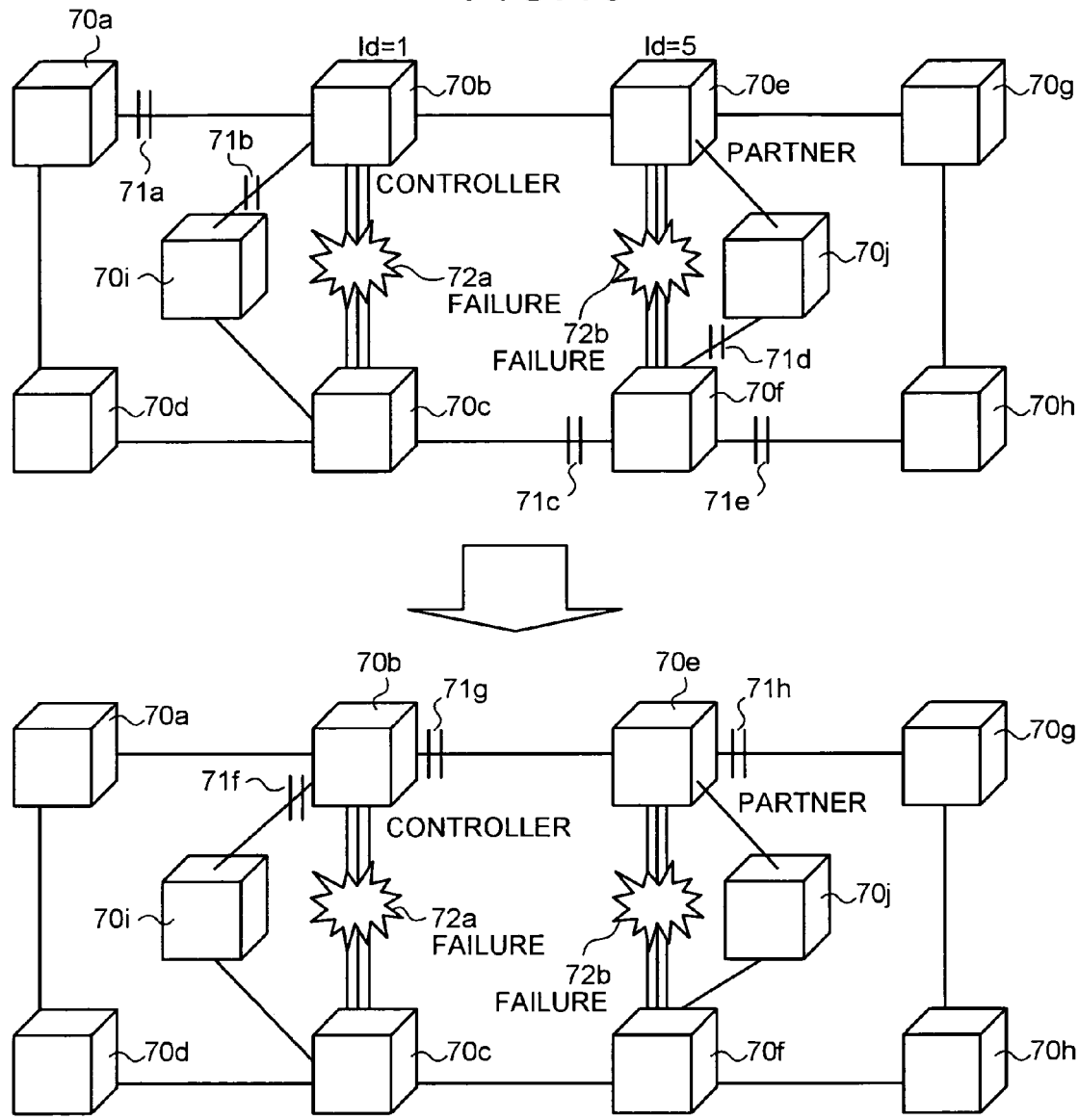
FIG. 13 is a diagram to explain a protection process performed when failures occur to two respective shared links if three ring networks belong to the data relay apparatus.

A protection process performed when failures occur to two respective shared links if three ring networks belong to the data relay apparatus (node) will be explained next with reference to FIG. 13.

Three ring networks belong to each of nodes 70b, 70c, 70e, and 70f. In this example, similar to the example shown in FIG. 12, a pair of nodes that operates independently during occurrence of a failure is set in advance. In the example shown in FIG. 13, a pair of the nodes 70b and 70e is selected.

The selected nodes 70b and 70e exchange control information when failures occur to two shared links. The node 70b having a smaller shared link ID is set as a controller that operates independently during occurrence of the failures. The node 70e having a larger shared link ID is set as a partner.

Further, the node 70a serving as a master node and nodes 70f and 70i logically block ports 71a to 71d to prevent occurrence of a loop path.

If failures 72a and 72b occur to the two shared links, the node 70b serving as a controller sets two ports 71f and 71g other than those connected to the shared link into logically blocked state, and sets remaining one node into a forwarding state.

The node 70e serving as the partner logically blocks one port 71h other than those connected to the shared link and a port connected to the node 70b serving as the controller.

On the other hand, the node 70a serving as the master node and nodes 70f and 70i release the logically blocked ports 71a to 71e when the failures 72a and 72b are detected. Consequently, if the failures 72a and 72b occur to the two shared links, respectively, data packets can be transmitted while preventing occurrence of the loop path.

A protection process performed if the numbers of ring networks belonging to the data relay apparatuses (nodes) differ will be explained next with reference to FIG. 14.

Three ring networks belong to each of nodes 80*b* and 80*c*, and two ring networks belong to each of nodes 80*e* and 80*f*. In this example, similar to the example shown in FIG. 12, a pair of nodes that operate independently during occurrence of failures is set in advance. In the example shown in FIG. 14, a pair of nodes 80*b* and 80*e* is selected.

If the number of ring networks belonging to the node 80*b* differs from that belonging to the node 80*e*, then the node 80*b* having more ring networks is set as a controller that operates independently during occurrence of a failure, and the node 80*e* having fewer ring networks is set as a partner, irrespective of their shared link IDs.

Further, the node 80*a* serving as a master node and the nodes 80*f* and 80*i* logically block ports 81*a* to 81*d* to prevent a loop path.

If failures 82*a* and 82*b* occur to two respective shared links, then the node 80*b* serving as the controller sets two ports 81*e* and 81*f* other than those connected to the shared links into a logically blocked state, and sets the remaining node into a forwarding state.

The node 80*e* serving as a controller also checks whether the number of ring networks belonging to the node 80*b* differs from that belonging to itself by receiving control information from the node 80*b*. If determined that the number of ring networks differs, the node 80*e* does not execute the process for logically blocking the ports.

If the failures 82*a* and 82*b* are detected, then the node 80*a* serving as the master node and the nodes 80*f* and 80*i* release the logically blocked ports 81*a* to 81*d*. By doing so, even if the failures 82*a* and 82*b* occur to the two respective shared links, data packet transmission can be performed while preventing occurrence of the loop path.

A master node setting process performed by the data relay apparatus (node) if a link is restored from a failure will be explained next with reference to FIG. 15. An example in which shared links are restored from the link failures shown in FIG. 12 will be explained herein.

Figure 15:
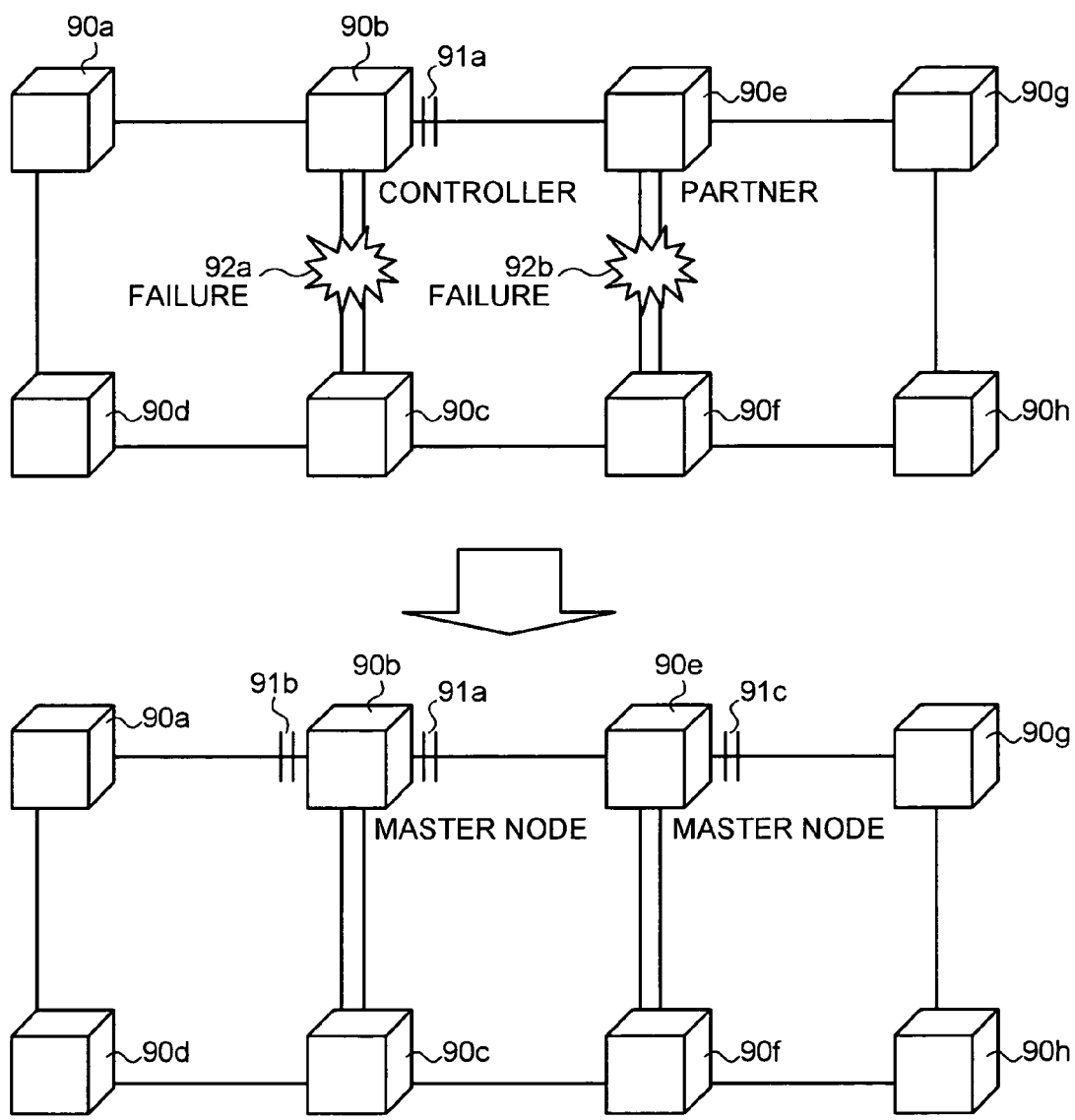
FIG. 15 is a diagram to explain a master node setting process performed by the data relay apparatus if a link is restored from a failure.

In the example shown in FIG. 15, if a failure 92*a* occurs to a shared link shared between nodes 90*b* and 90*c* and a failure 92*b* occurs to a shared link shared between nodes 90*e* and 90*f*, the node 90*b* serving as a controller logically blocks a port 91*a* to prevent occurrence of a loop path.

To restore the shared links from the failures 92*a* and 92*b*, the node 90*b* serving as the controller is set as a master node in a ring network of nodes 90*a*, 90*b*, 90*c*, and 90*d*, and another ring network of nodes 90*b*, 90*c*, 90*f*, and 90*e*. The node 90*b* logically blocks ports 91*a* and 91*b* connected to the respective ring networks, thereby preventing occurrence of a loop path.

The node 90*e* serving as a partner is set as a master node in a ring network of nodes 90*e*, 90*f*, 90*h*, and 90*g*, and logically blocks a port 91*c* for the ring network other than the ring network shared between the ports 90*b* and 90*e*, thereby preventing occurrence of a loop path. The node 90*e* checks that the ring network is shared with the node 90*b* by exchanging control information with the node 90*b*.

Figure 16:
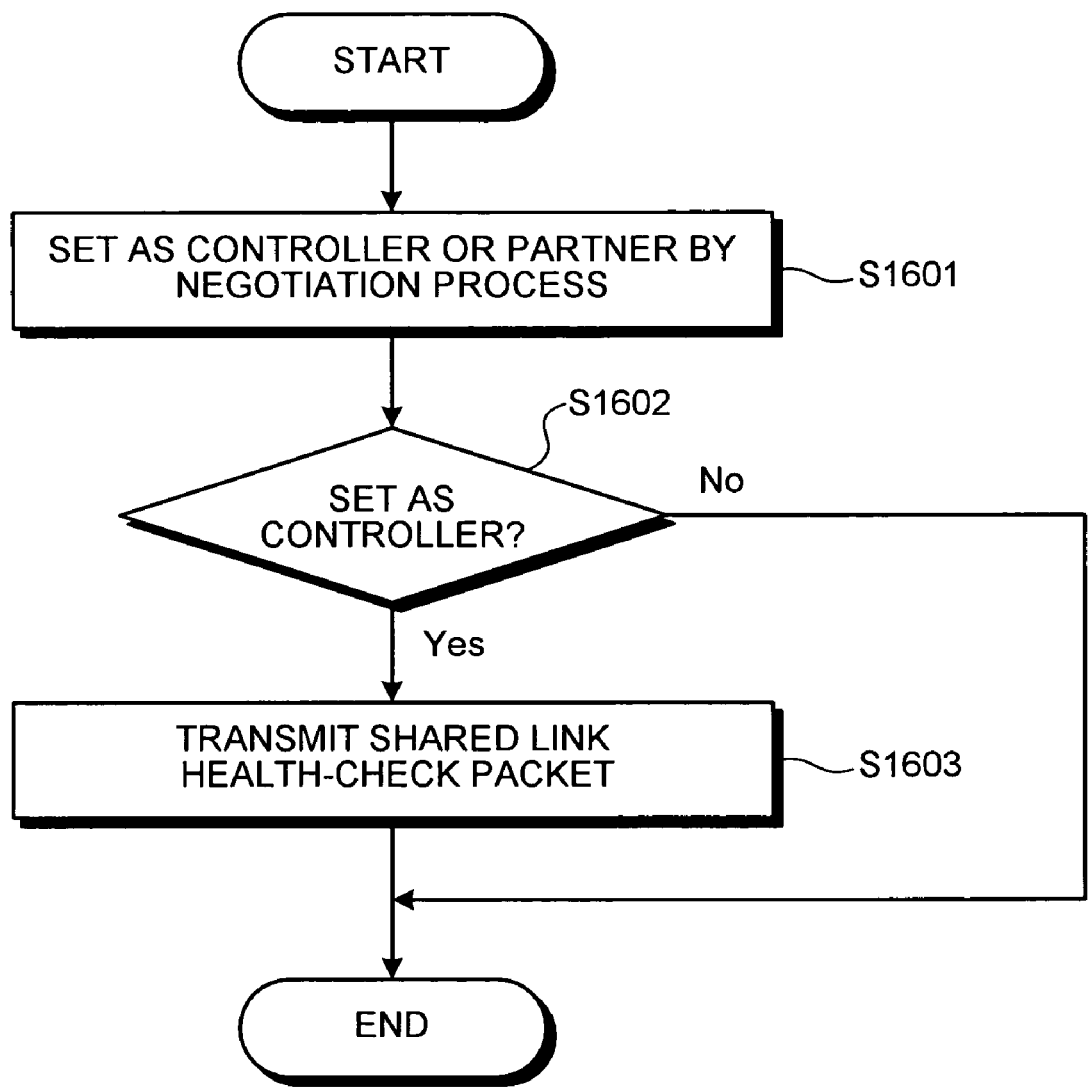
FIG. 16 is a flowchart of process procedures of a controller/partner setting process performed by the data relay apparatus.

Process procedures for a controller/partner setting process performed by the data relay apparatus (node) will be explained next, with reference to a flowchart in FIG. 16.

The node setting unit 23 of the data relay apparatus performs a negotiation process to compare shared link IDs. If a shared link ID of the self node is smaller, the self node is set as a controller. If the shared link ID of the self node is larger, the self node is set as a partner (step S1601).

The node processing executing unit 24 checks whether the self node is set as a controller (step S1602). If the self node is set as the controller (Yes at step S1602), the node processing executing unit 24 starts transmitting a health-check packet, for detecting a failure that occurs to a shared link, to ports connected to the shared link (step S1603).

If the self node is set as the partner (No at step S1602), this controller/partner setting process ends.

Process procedures for a protection process performed by each data relay apparatus (node) connected to a shared link during occurrence of a failure to the shared link will be explained next with reference to a flowchart in FIG. 17. The protection process of when the number of rings belonging to the data relay apparatus is 2 or 3 will be explained herein.

The failure detector 22 of the data relay apparatus detects a failure that occurs to the shared link connected to the self node (step S1701). The failure detector 22 checks whether any other failure has occurred to the other shared link, by checking whether the self node receives control information from the other node indicating that the failure occurs (step S1702).

If no failure occurs to the other shared link (No at step S1702), the node processing executing unit 24 checks the number of ring networks belonging to the self node (step S1703).

If the number of ring networks is 2 (2 at step S1703), the node processing executing unit 24 logically blocks one port other than those connected to the shared link to which the failure occurs (step S1704). If the number of ring networks is 3 (3 at step S1703), the node processing executing unit 24 logically blocks two ports other than those connected to the shared link to which failure occurs (step S1705).

If it is determined that a failure occurs to other shared link at the step S1702 (Yes at step S1702), the node processing executing unit 24 executes a plural failure occurrence process (step S1706), and thereafter, this protection process ends.

Figure 17:
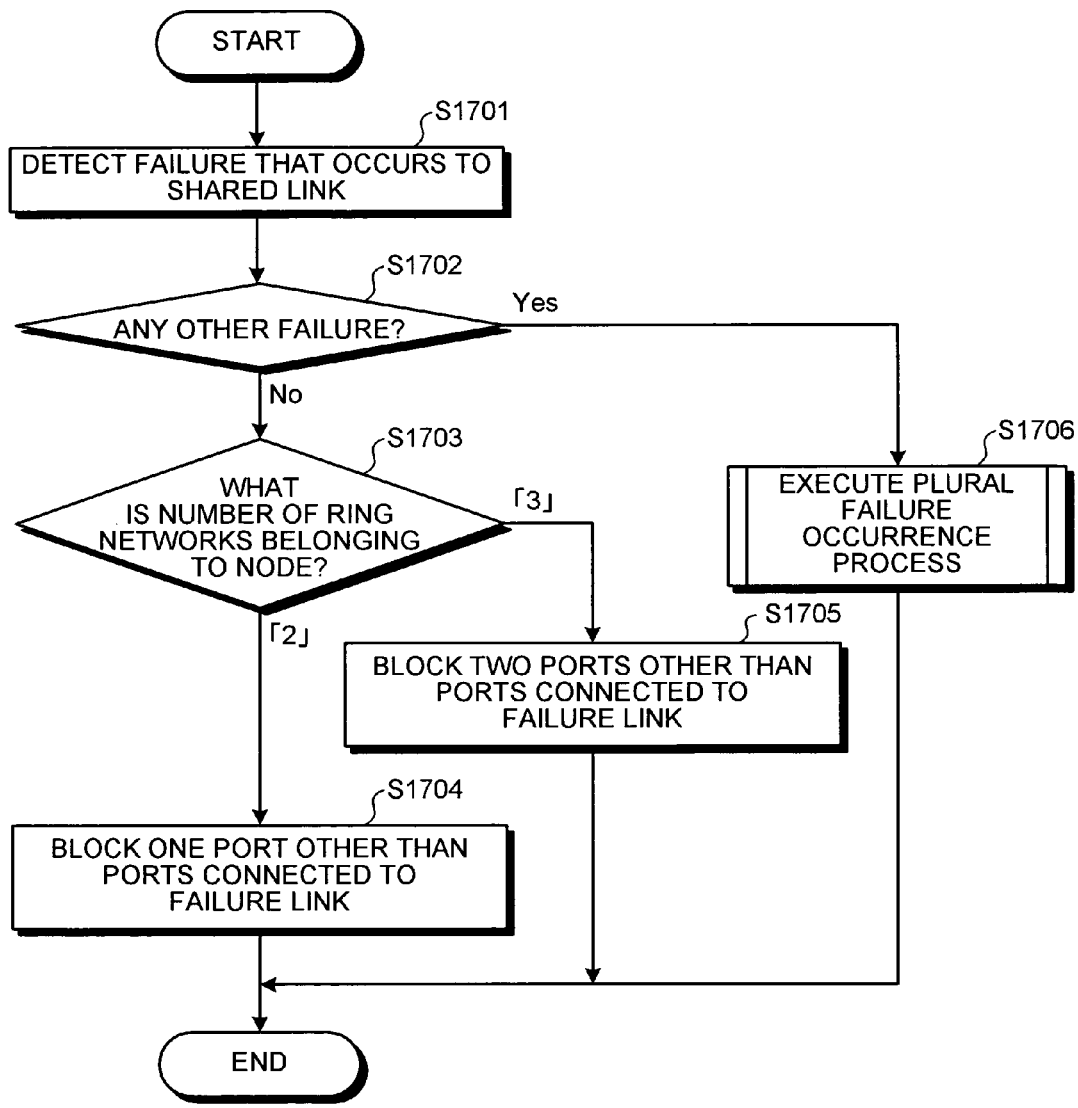
FIG. 17 is a flowchart of process procedures for a protection process performed by the data relay apparatus connected to a shared link during occurrence of a failure to the shared link.
Figure 18:
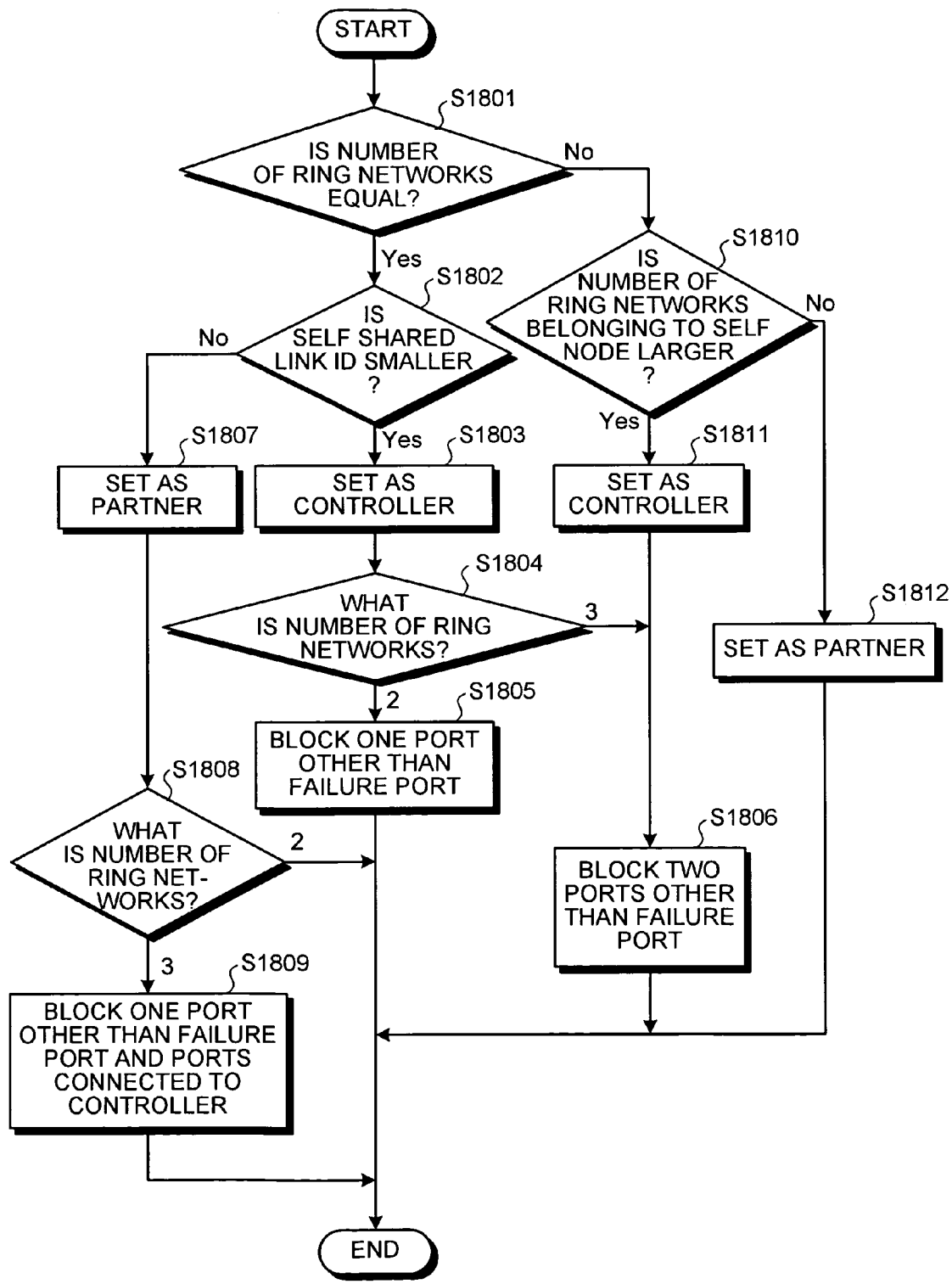
FIG. 18 is a flowchart of process procedures for a plural failure occurrence process shown in FIG. 17, performed by the data relay apparatus.

FIG. 18 is a flowchart of process procedures for the plural failure occurrence process performed by the data relay apparatus (node) shown in FIG. 17. The node setting unit 23 of the data relay apparatus determines whether the number of ring networks belonging to the self node is equal to that of ring networks belonging to the other node, based on information on the number of ring networks belonging to the other node, which is included in the control information received from the other node (step S1801).

If the numbers are equal (Yes at step S1801), the node setting unit 23 checks whether the shared link ID of the shared link of the self node is smaller than the shared link ID of the shared link of the other node (step S1802).

If the shared link ID of the shared link which belongs to the self node is smaller (Yes at step S1802), the node setting unit 23 sets the self node as a controller (step S1803).

The node processing executing unit 24 checks the number of ring networks belonging to the self node (step S1804). If the number of ring networks belonging to the self node is 2 (2 at step S1804), then the node processing executing unit 24 logically blocks one port other than the ports connected to the shared link to which the failure occurs (step S1805), and the plural failure occurrence process ends.

If the number of ring networks belonging to the self node is 3 (3 at step S1804), then the node processing executing unit 24 logically blocks two ports other than the ports connected to the shared link to which the failure occurs (step S1806), and the plural failure occurrence process ends.

If it is determined at the step S1802 that the shared link ID of the shared link belonging to the self node is not smaller (No at step S1802), the node setting unit 23 sets the self node as a partner (step S1807).

The node processing executing unit 24 checks the number of ring networks belonging to the self node (step S1808). If the number of ring networks belonging to the self node is 2 (2 at step S1808), the plural failure occurrence process ends.

If the number of ring networks belonging to the self node is 3 (3 at step S1808), then the node processing executing unit 24 logically blocks one port other than the ports connected to the shared link to which the failure occurs and the ports connected to the link connected to the controller (step S1809), and the plural failure occurrence process ends.

If it is determined at the step S1801 that the number of ring networks belonging to the self node is not equal to that belonging to the other node (No at step S1801), the node setting unit 23 checks whether the number of ring networks belonging to the self node is larger than that belonging to the other node that detects occurrence of the failure to the other shared link (step S1810).

If the number of ring networks belonging to the self node is larger (Yes at step S1810), the node setting unit 23 sets the self node as a controller (step S1811).

The processing then proceeds to the step S1806, at which the node processing executing unit 24 logically blocks two ports other than those connected to the shared link to which the failure occurs, and the plural failure occurrence process ends.

If the number of ring networks belonging to the self node is not larger (No at step S1810), the node setting unit 23 sets the self node as a partner (step S1812), and the plural failure occurrence process ends.

Figure 19:
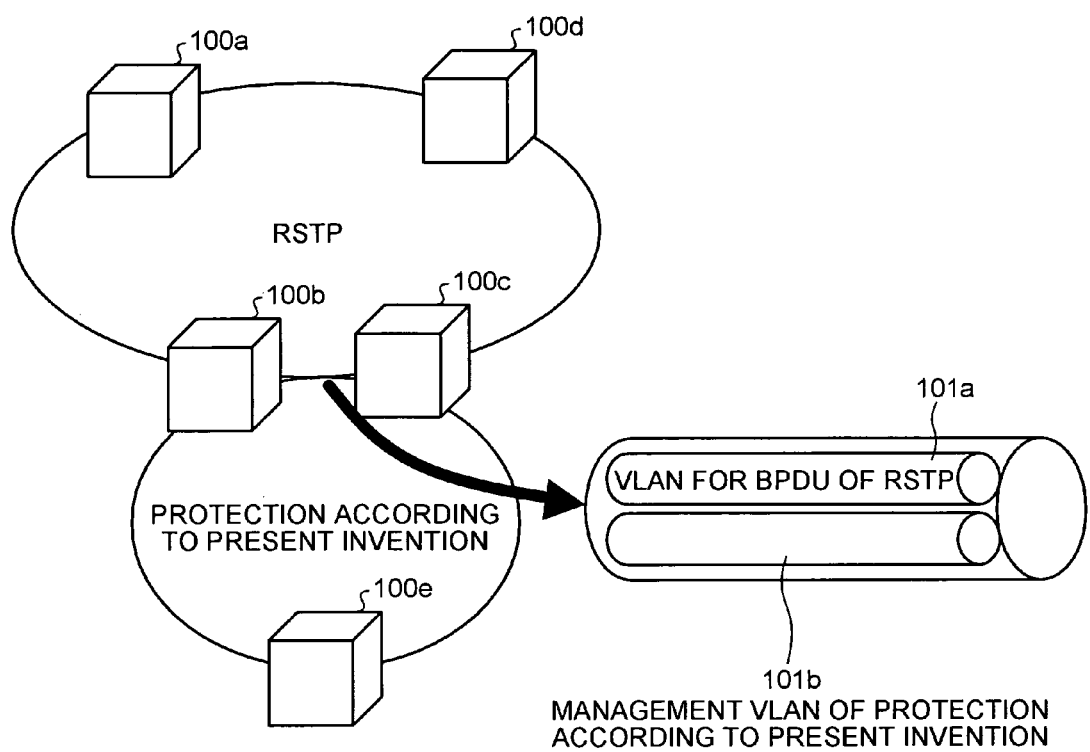
FIG. 19 is one example of a combination of the ring network protection method of the present invention with another ring network protection method.

An example of combining the ring network protection method explained in the embodiment of the present invention with another ring network protection method will be explained next with reference to FIG. 19. FIG. 19 is an example in which the ring network protection method according to the embodiment combined with Rapid Spanning Tree Protocol (RSTP) of the IEEE802.1D standard, which is the other network protection method.

An RSTP ring network constituted by connecting nodes 100a, 100b, 100c, and 100d to one another, and a ring network according to the embodiment constituted by connecting the nodes 100b, 100c, and 100e to one another share a link between the nodes 100b and 100c.

The nodes 100a, 100b, 100c, and 100d are data relay apparatuses (nodes) corresponding to the RSTP, whereas the nodes 100b, 100c, and 100e are data relay apparatuses corresponding to the protection method according to the present invention.

In this example, a VLAN that transmits a bridge protocol data unit (BPDU), which is control information on the RSTP, is separated from a VLAN that transmits the control information used in the ring network protection method explained in the present embodiment. The nodes 100b and 100c are caused to pass through the BPDU of the RSTP.

With the above scheme, an apparatus that corresponds to the protection method other than that explained in the present embodiment can be used, improving flexibility of constructing a network.

An example in which data traffic load distribution is performed by the protection method explained in the embodiment will be explained next with reference to FIG. 20.

Figure 20:
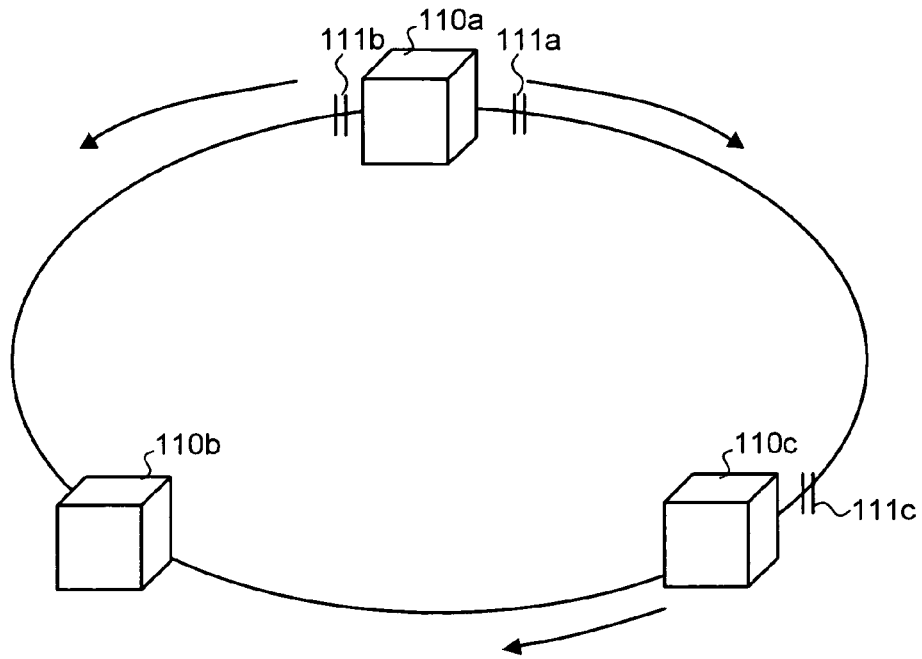
FIG. 20 is one example of data traffic load distribution performed by the protection method according to the embodiment.

FIG. 20 depicts a ring network constituted by connecting nodes 110a, 110b, and 110c to one another. A master node and a logically blocked port are set for every user who uses this ring network.

For example, for a user 1, the node 110a is a master node, and a port 111b, on the side of the node 110b of the node 110a, is logically blocked. For a user 2, the node 110a is a master node, and a port 111a, on the side of the node 110c of the node 110a, is logically blocked.

Thus, a data packet of the user 1 is transmitted from the node 110a in a direction of the nodes 110c and 110b, and a data packet of the user 2 is transmitted from the node 110a in a direction of the nodes 110b and 110c.

As can be seen, by setting the master node and the logically blocked port for every user who uses the ring network, a data packet transmission direction can be selected, and a load on data transmission can be distributed.

An example of combining the ring network protection method explained in the embodiment with a link redundancy method will be explained next, with reference to FIG. 21.

In this example, an Ethernet protection switch (EPS) (registered trademark) method is adopted as the link redundancy method. In the EPS method, a backup link is provided for a link that is currently used, and the link is promptly switched to the backup link when a failure occurs to the currently used link, thereby preventing data communication cut-off.

Figure 21:
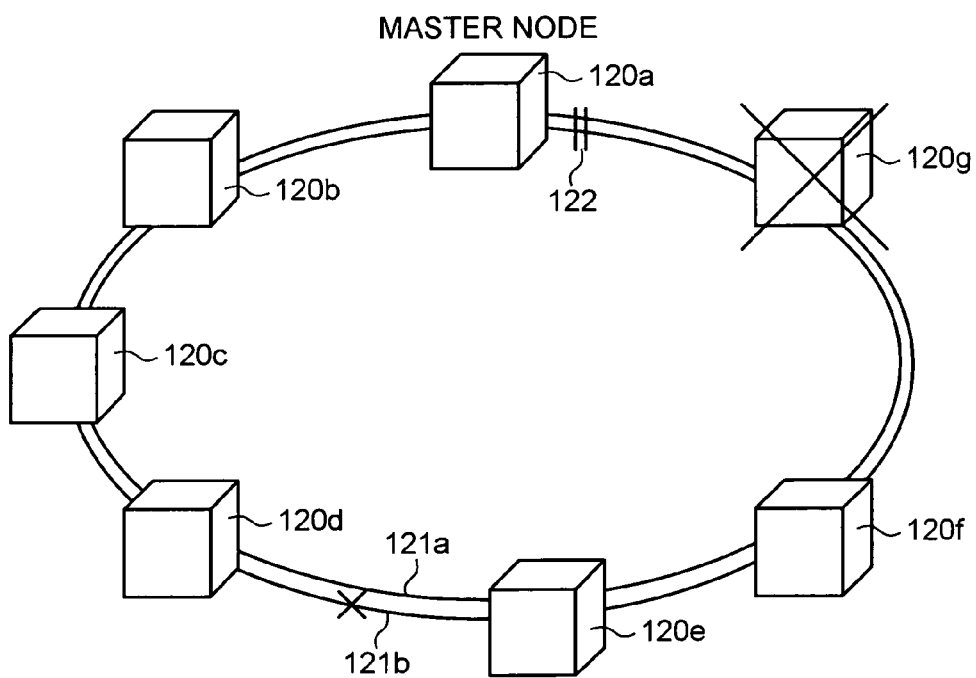
FIG. 21 is one example of combining the ring network protection method of the present invention with a link redundancy method.
Figure 22:
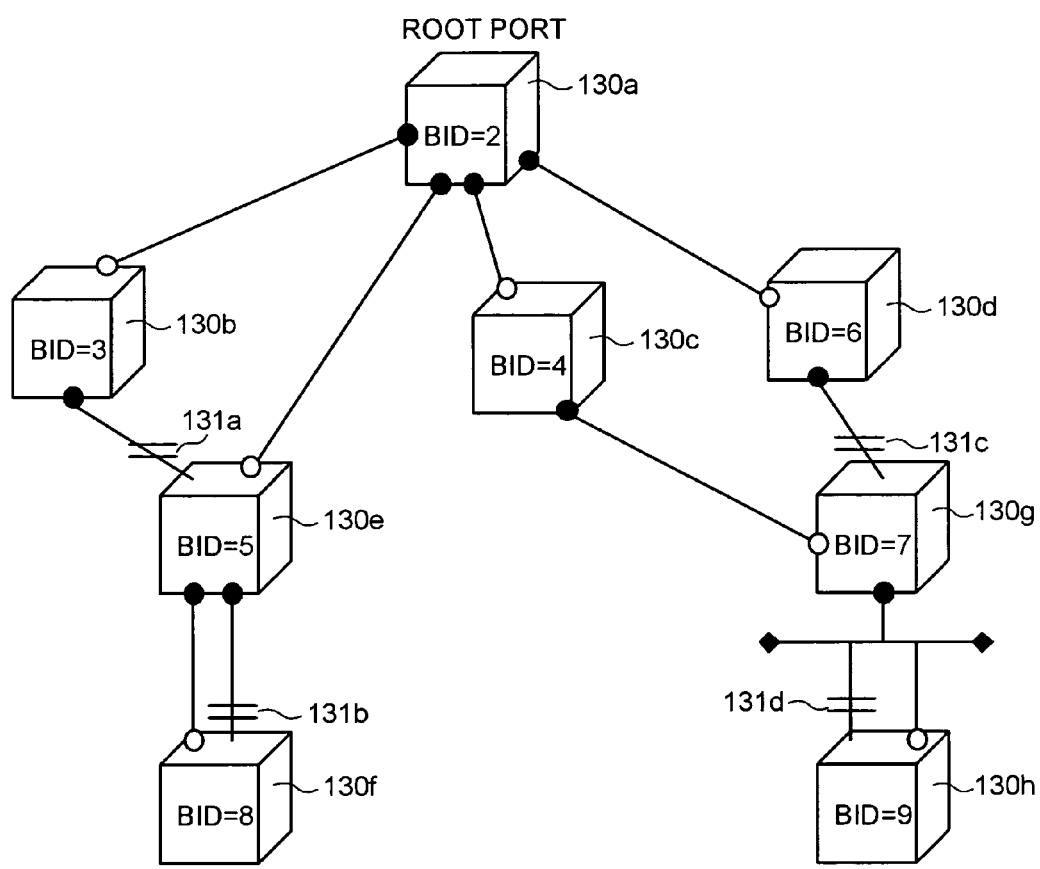
FIG. 22 is one example of a network constructed according to a spanning tree protocol technology.

In the example shown in FIG. 21, the EPS method is combined with the ring network protection method according to the embodiment. The communication cut-off is avoided by the EPS method when a failure occurs to a link. The communication cut-off is avoided by the ring network protection method according to the embodiment when a failure occurs to a node.

By thus combining the ring network protection method according to the embodiment with the link redundancy method, a highly reliable network can be constructed.

As explained above, according to the embodiment of the present invention, the storage unit 30 of the data relay apparatus stores identification information for identifying a self apparatus. When a failure occurs to a link connected to the self apparatus, the node processing executing unit 24 blocks a port connected to the link to which the failure occurs. When the link connected to the blocked port is restored from the failure, the node setting unit 23 compares identification information on an apparatus other than the self apparatus and connected to the link with the identification information stored in the storage unit; and based on the comparison result, it is determined whether the self apparatus is set as the master node. Therefore, by setting the data relay apparatus adjacent to a port to which the link failure occurs as the master node, the number of times of communication cut-off reduces, and the network is speedily restored from the link failure.

According to the embodiment, when a failure occurs to a first apparatus connected to a first link connected to the self apparatus, the node processing executing unit 24 blocks a port connected to the first link, and when the first apparatus is restored from the failure, the node setting unit 23 compares identification information on a second apparatus connected to a second link connected to the first apparatus with the stored identification information. Therefore, by setting the data relay apparatus adjacent to a port to which the link failure occurs as the master node, the number of times of communication cut-off reduces, and the network is speedily restored from the node failure.

According to the embodiment, if a plurality of ring networks are present, the node setting unit 23 compares identification information for each ring network to which a failure occurs, and it is determined whether the self apparatus is set as the master node for each ring network. Therefore, even if a plurality of ring networks are present, each network can be speedily restored from the network failure by reducing the number of times of communication cut-off.

According to the embodiment, if a failure occurs to a shared link shared among a plurality of ring networks, the node processing executing unit 24 determines a port to be blocked other than ports connected to the shared link to which the failure occurs, based on the number of ring networks that constitute the shared link, and blocks the port determined to be blocked. Therefore, even if a ring network includes a shared link, the network can be speedily restored from a network failure by reducing the number of times of communication cut-off.

According to the embodiment, if the self apparatus is the master node and the failure that occurs is a failure on an already blocked port side, the node processing executing unit 24 continues to block the port. Therefore, efficiency improves by dispensing with an unnecessary master node setting process.

According to the embodiment, if a failure occurs to the link connected to the self apparatus, the node processing executing unit 24 switches a data transmission path to a redundant link provided on the link. If a failure occurs to an apparatus other than the self apparatus and connected to the link connected to the self apparatus, the node processing executing unit 24 blocks a port connected to the link. Therefore, a combination of a restoration method of the present invention with an existing redundant link method can be utilized.

The embodiment of the present invention is explained in detail so far with reference to the accompanying drawings. However, specific examples of the configuration are not limited to the embodiment, and design changes and the like, which do not depart from a scope of the present invention, are also included in the present invention.

For example, the respective functions of the data relay apparatus may be realized by recording a program for realizing the functions in a Network-Element readable recording medium, and by allowing a software to read and execute the program recorded in the recording medium.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data relay apparatus that relays data in a ring network, comprising:
    a storage unit that stores identification information for identifying the data relay apparatus;
    a blocking unit that blocks a port to avoid an occurrence of a loop path if the data relay apparatus is a master node, and that blocks a port connected to a link of the data relay apparatus if a failure occurs to the link;
    a comparing unit that compares identification information of an other data relay apparatus with the identification information stored, when the link connected to the port blocked is restored from the failure, wherein the other data relay apparatus is connected to the data relay apparatus via the link; and
    a determining unit that determines whether the data relay apparatus should be set as the master node, based on the result of the comparison made.

2. The data relay apparatus according to claim 1, wherein when a failure occurs to a first data relay apparatus connected to the data relay apparatus via a first link, the blocking unit blocks a port connected to the first link, and
    when the first data relay apparatus is restored from the failure, the comparing unit compares identification information of a second apparatus, which is connected to the first apparatus via a second link, with the identification information stored in the storage unit.

3. The data relay apparatus according to claim 1, wherein if a plurality of ring networks are present, the comparing unit compares identification information of each ring network in which a failure occurs, and the determining unit determines whether the data relay apparatus is set as the master node for each ring network.

4. The data relay apparatus according to claim 1, wherein if a failure occurs to a shared link shared among a plurality of ring networks, the blocking unit determines a port to be blocked, other than a port connected to the shared link to which the failure occurs, based on the number of ring networks that include the shared link, and blocks the port determined to be blocked.

5. The data relay apparatus according to claim 4, wherein one of the ring networks shared by the shared links follows Rapid Spanning Tree Protocol (RSTP) of the IEEE802.1D standard.

6. The data relay apparatus according to claim 4, wherein if there is a plurality of ring networks, the number of ring networks is any one of two and three.

7. The data relay apparatus according to claim 1, wherein if the data relay apparatus is the master node and the failure occurs on an already blocked port side, the blocking unit continues to block the port.

8. The data relay apparatus according to claim 1, wherein
    if a failure occurs to the link connected to the data relay apparatus, the blocking unit switches a data transmission path to a redundant link provided on the link, and
    if a failure occurs to another data relay apparatus connected to the data relay apparatus via the link, the blocking unit blocks a port connected to the link.

9. The data relay apparatus according to claim 6, wherein the redundant link is of an Ethernet protection switch (EPS) type.

10. A data relay method for relaying data in a ring network, comprising:
    storing identification information for identifying a data relay apparatus;
    blocking a port to avoid an occurrence of a loop path if the data relay apparatus is a master node, and blocking a port connected to a link of the data relay apparatus, if a failure occurs in the link;
    comparing identification information of an other data relay apparatus with the identification information stored, when the link connected to the port blocked by the blocking unit is restored from the failure, wherein the other data relay apparatus is connected to the data relay apparatus via the link; and
    determining whether the data relay apparatus should be set as the master node, based on the result of the comparison made.

11. A computer-readable recording medium that records thereon, a computer program that includes instructions which, when executed, cause the computer to execute:
    storing identification information for identifying a data relay apparatus;
    blocking a port to avoid an occurrence of a loop path if the data relay apparatus is a master node, and blocking a port connected to a link of the data relay apparatus, if a failure occurs in the link;
    comparing identification information of an other data relay apparatus with the identification information stored, when the link connected to the port blocked by the blocking unit is restored from the failure, wherein the other data relay apparatus is connected to the data relay apparatus via the link; and
    determining whether the data relay apparatus should be set as the master node, based on the result of the comparison made.

* * * * *